US009473735B1

(12) United States Patent
Gruenig

(10) Patent No.: US 9,473,735 B1
(45) Date of Patent: *Oct. 18, 2016

(54) MOVING FRAME DISPLAY

(71) Applicant: James Gruenig, Novato, CA (US)

(72) Inventor: James Gruenig, Novato, CA (US)

(*) Notice: Subject to any disclaimer, the term of this patent is extended or adjusted under 35 U.S.C. 154(b) by 104 days.

This patent is subject to a terminal disclaimer.

(21) Appl. No.: 14/287,178

(22) Filed: May 26, 2014

Related U.S. Application Data

(63) Continuation of application No. 13/350,805, filed on Jan. 15, 2012, now Pat. No. 8,736,664.

(51) Int. Cl.
| | | |
|---|---|---|
| *H04N 7/18* | (2006.01) | |
| *H04N 5/911* | (2006.01) | |
| *H04N 5/93* | (2006.01) | |

(52) U.S. Cl.
CPC ............. *H04N 5/911* (2013.01); *H04N 5/93* (2013.01)

(58) Field of Classification Search
CPC .......... H04N 5/911; H04N 5/93; H04N 7/18; G06T 3/4038
USPC .......................................................... 348/36
See application file for complete search history.

(56) References Cited

U.S. PATENT DOCUMENTS

| | | | | |
|---|---|---|---|---|
| 2004/0196282 A1* | 10/2004 | Oh | ........................ | G06T 7/0022 345/419 |
| 2006/0069591 A1* | 3/2006 | Razzano | ................ | G06Q 50/22 705/2 |
| 2007/0025723 A1* | 2/2007 | Baudisch | ............... | G03B 13/02 396/287 |
| 2008/0143727 A1* | 6/2008 | Oh | .......................... | G06T 13/20 345/474 |
| 2009/0022422 A1* | 1/2009 | Sorek | .................... | G06T 3/4038 382/284 |
| 2009/0135178 A1* | 5/2009 | Aihara | .................. | G06T 15/205 345/419 |
| 2009/0219300 A1* | 9/2009 | Peleg | ................ | G06F 17/30843 345/630 |

* cited by examiner

Primary Examiner — Mohammed Rahaman
(74) Attorney, Agent, or Firm — Patent Law Offices of Michael E. Woods; Michael E. Woods

(57) ABSTRACT

An apparatus and method of providing a display that simplifies presentation of related video frames to enable a user to better see and interpret videos exhibiting a high degree of localized apparent image jitter. The present invention includes embodiments directed towards presentation of image sequences in a contextual display responsive to a contextual map for controlling apparent jitter and towards compositing for production of contextual maps by co-locating content alignment attributes which results in non-alignment of individual frames.

5 Claims, 36 Drawing Sheets

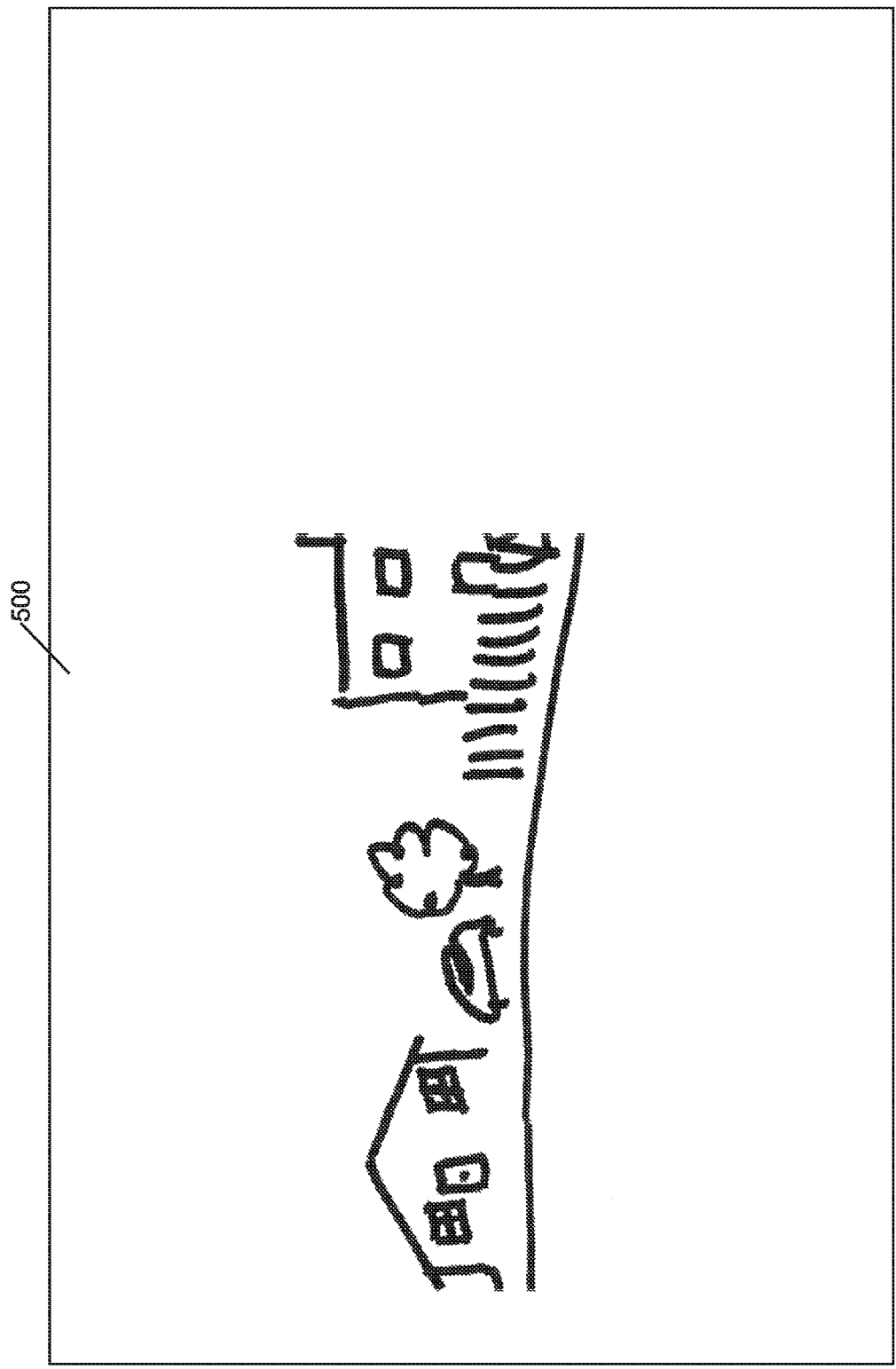

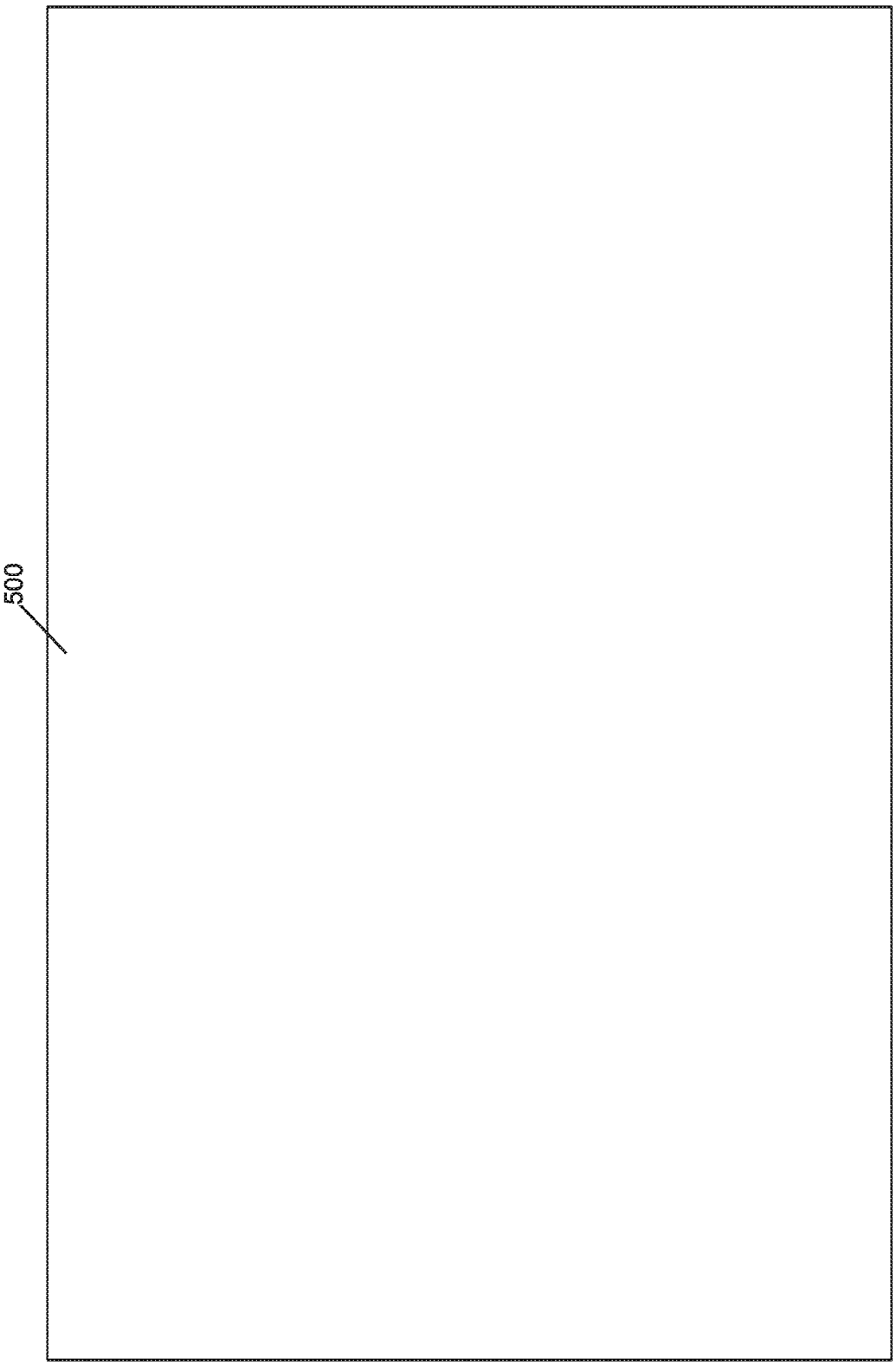

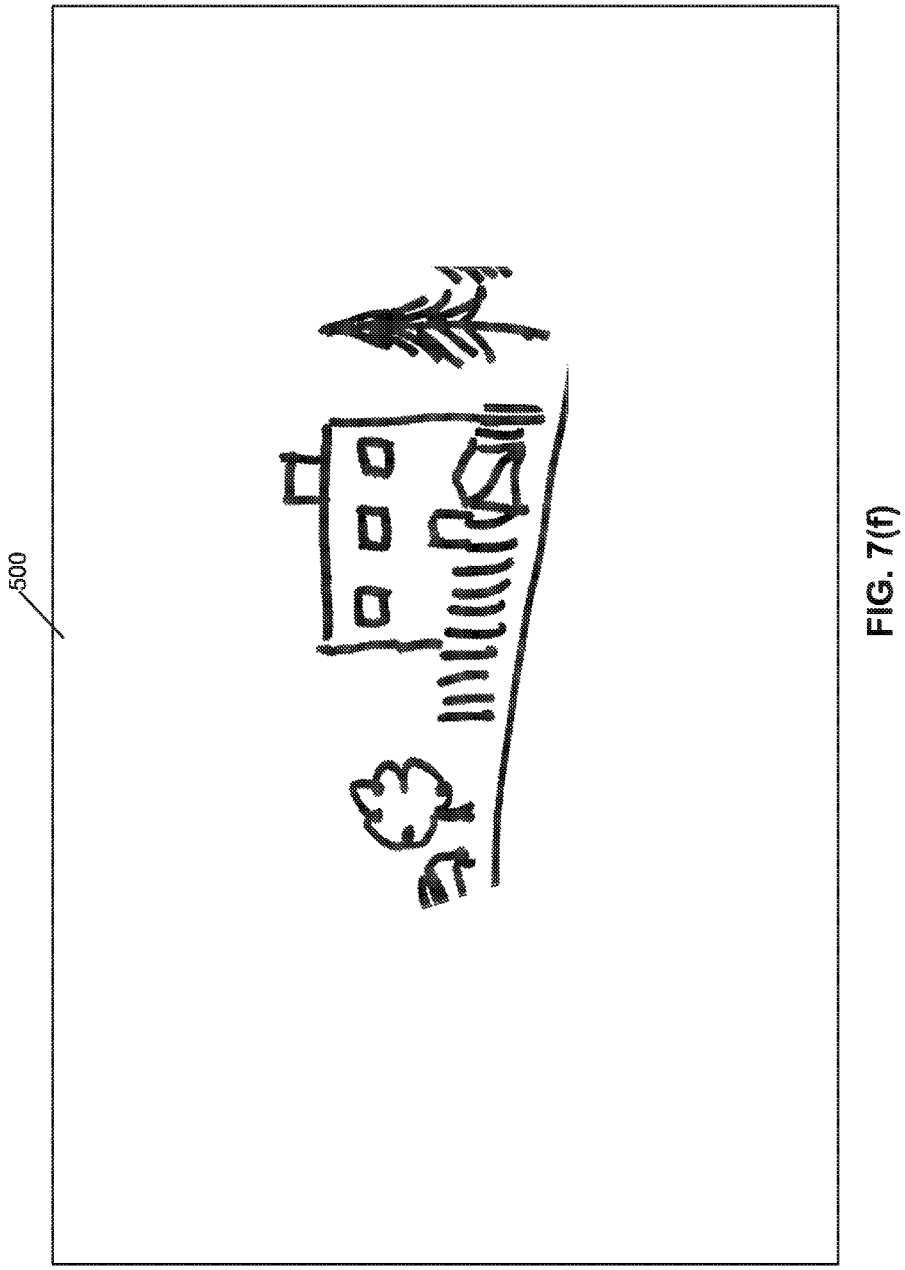

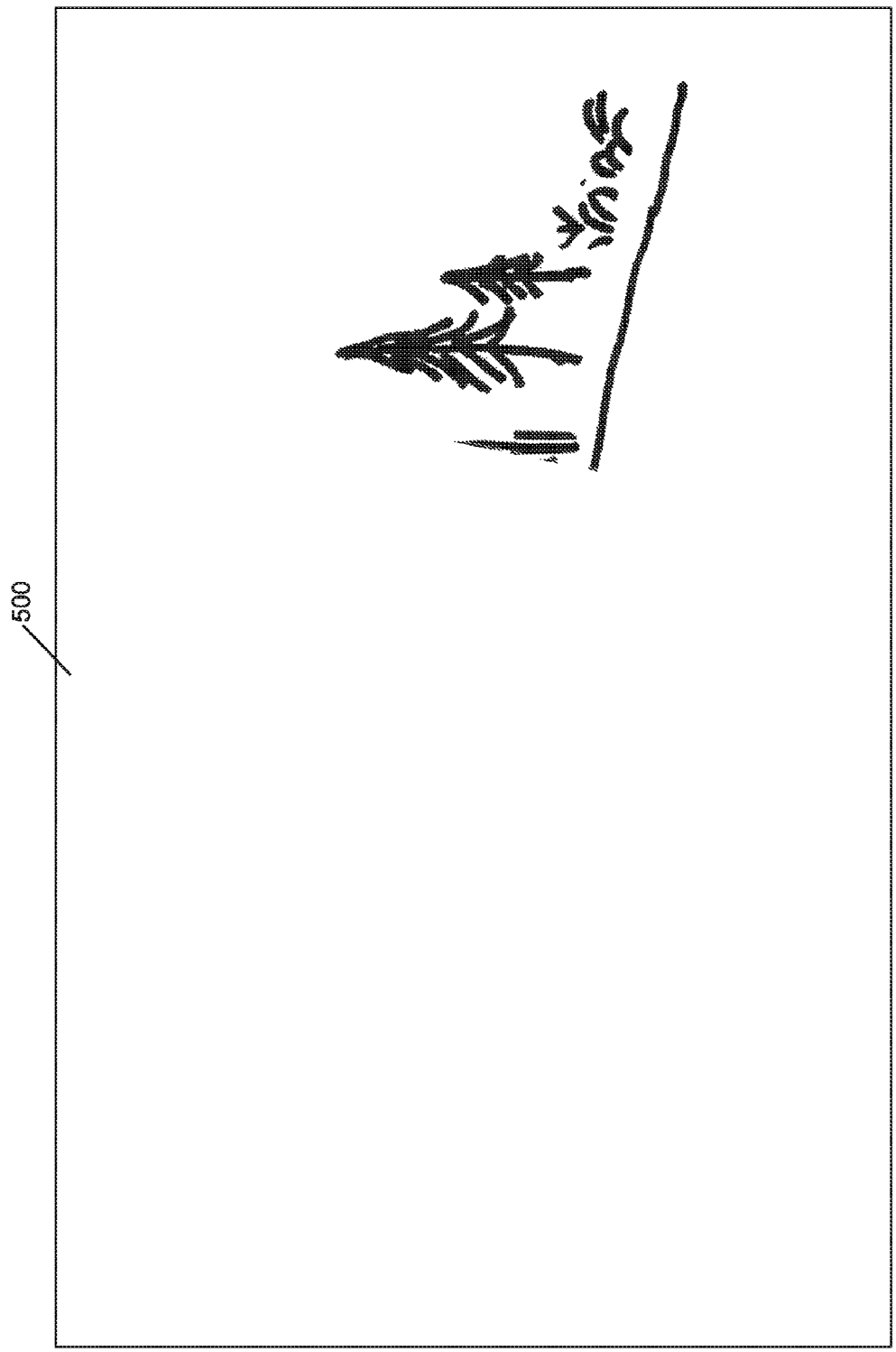

FIG. 7(k)

MOVING FRAME DISPLAY

CROSS REFERENCE TO RELATED APPLICATIONS

This application is a continuation of U.S. patent application Ser. No. 13/350,805 filed 15 Jan. 2012, the contents of which is hereby expressly incorporated by reference for all purposes.

BACKGROUND OF THE INVENTION

The present invention relates generally to presentation of a series of related images, and more particularly, but not exclusively, to presentation of those images in a larger consistent frame of reference that dampens localized apparent image jitter.

Many types of portable electronic devices allow a user to capture a series of images, the uses of these devices are causing significant growth in a quantity of digital photographs that are casually acquired and displayed. In most cases these images are captured under non-ideal conditions, with non-ideal acquisition equipment, by non-professional imagers. For example, in situations such as filming with a hand-held camera: a) from a moving vehicle, b) during sporting activities, c) in a high-vibration environment, d) by a user with novice filming skills, and/or e) while imaging in extreme high-stress situations (e.g., while running on foot), many image sequences exhibit, when played back using conventional players, a high degree of unwanted motion or jitter caused from randomized motion of the camera about the desired field-of-view. Even videos acquired in normal conditions show a certain amount of unwanted shaking, and under some conditions professional imagers will produce image sequences with undesirable amounts of shaking.

There exist several methods for stabilizing a video image, either as the image is being acquired, or as a post-processing step before display. Some cameras provide mechanical image stabilization at the time the image is acquired, utilizing inertial measuring devices such as accelerometers or gyroscopes to provide information to calculate camera motion in real time. Digital techniques can be employed that typically involve calculating image motion based on matching regions within the images themselves that are assumed to represent stable background features. These techniques suffer from limitations of accuracy, reliability, applicability, and computation time (not to mention energy, size, and cost considerations) and tend to work most effectively only when the jitter motion is small. These stabilization techniques generally involve some loss or compromise of the photographic information that is available in the raw, unprocessed image data. These solutions and techniques treat the randomized noise effects of the camera motion as undesirable distortion and interference to be eliminated. They are practically useless in cases where the camera motion is so great that, for example, one image frame may have moved completely outside the bounds of the previous image frame. The resulting presentation is often extremely awkward and difficult to see, and demands significant extra effort to interpret.

There exists a need for an apparatus and method of providing a display that simplifies presentation of related video frames to enable a user to better see and interpret videos exhibiting a high degree of localized apparent image jitter.

BRIEF SUMMARY OF THE INVENTION

Disclosed is an apparatus and method of providing a display that simplifies presentation of related video frames to enable a user to better see and interpret videos exhibiting a high degree of localized apparent image jitter. The present invention includes embodiments directed towards presentation of image sequences in a contextual display responsive to a contextual map for controlling apparent jitter and towards compositing for production of the contextual maps. Embodiments of the present invention are useful for videos having small amounts of such jitter as well.

A presentation system includes a parser producing a set of discrete frames from a series of related image frames representing a scene; a compositor, responsive to the set of discrete frames, generating a context map that identifies a plurality of transformational attributes between each discrete frame of the set of discrete frames; and a presenter, responsive to the context map, generating a presentation of the set of discrete frames within a display field larger than a frame size of each of the discrete frames wherein the presentation includes overlapping non-aligned discrete frames collectively reproducing the scene.

A computer-implemented presentation method using a microprocessor includes a) producing, using the microprocessor, a set of discrete frames from a series of related image frames representing a scene; b) generating, responsive to the set of discrete frames and using the microprocessor, a context map that identifies a plurality of transformational attributes between each discrete frame of the set of discrete frames; and c) generating, responsive to the context map, a presentation of the set of discrete frames within a display field larger than a frame size of each of the discrete frames wherein the presentation includes overlapping non-aligned discrete frames collectively reproducing the scene.

Humans and many other animals do not look at a scene with a fixed steadiness; instead, a focus of the eyes changes quickly, locating interesting parts of a scene and building up a mental, three-dimensional 'map' corresponding to the scene. These rapid eye movements are called saccades. One reason for the saccadic movement of the human eye is that the central part of the retina—known as the fovea—plays a critical role in resolving object details. A human's saccades are very fast. Spatial location of visual information is preserved with great fidelity amid these rapid movements of the eyes.

The present invention includes apparatus, method, and computer-program product to present a series of images exhibiting some degree of apparent camera motion when viewed in a conventional manner, in a manner that naturally engages the inherent capacities of the eye to capture things in motion in relation to their environment, and creates an effective display of the motion picture without a destabilizing effect of localized apparent image jitter that is the usual result of the camera motion.

A video playback method for rendering a series of frames, a first frame of the series of frames sharing a content alignment attribute with a second frame of the series of frames, wherein the content alignment attribute has a different apparent location relative to a visible content of the first frame than it does relative to a visible content of the second frame, the method including (a) rendering the first frame of the series of frames, the rendering step (a) placing the first frame within a presentation system which positions the content alignment attribute of the first frame at a particular location; and thereafter (b) rendering the second frame of the series of frames, the rendering step (b) placing the second frame within the presentation system to position the content alignment attribute of the second frame with a predefined relationship to the particular location wherein the second frame is non-aligned with the first frame.

A video playback system rendering a series of frames, the series of frames sharing a plurality of content alignment attributes wherein a subset of content alignment attributes associated with a particular frame of the series of frames each have a different apparent location with respect to a visible content of the particular frame as compared to corresponding shared content alignment attributes of the subset of content alignment attributes with respect to a visible content associated with another frame of the series of frames includes a presenter sequentially rendering the series of frames on a presentation system, the presenter placing each frame as it is sequentially rendered in the presentation system wherein its content alignment attributes have a predefined relationship with respect to the content alignment attributes of previously rendered frames wherein the visible content of subsequently rendered frames is non-aligned with the visible content of previously rendered frames.

A compositing system for a series of frames, each frame of the series of frames sharing a content alignment feature wherein the content alignment feature in the series of frames has a different apparent location with respect to a visible content of adjacent frames in the series of frames includes a compositor processing the series of frames and generating a context map therefrom, the context map identifying a plurality of rendering parameters for each frame of the series of frames that would, when the series of frames are rendered responsive to the plurality of rendering parameters, produce a consistent placement of the content alignment feature within a virtual reference space as each frame would be rendered while non-aligning individual frames of the series of frames as they are rendered.

A presentation system including a parser producing a set of discrete frames from a series of related image frames representing a scene; a compositor, responsive to the set of discrete frames, generating a context map that identifies a plurality of transformational attributes between each discrete frame of the set of discrete frames; and a presenter, responsive to the context map, generating a presentation of the set of discrete frames within a display field larger than a frame size of each the discrete frame wherein the presentation includes overlapping non-aligned discrete frames collectively reproducing the scene.

A computer-implemented presentation method using a microprocessor, the method including a) producing, using the microprocessor, a set of discrete frames from a series of related image frames representing a scene; b) generating, responsive to the set of discrete frames and using the microprocessor, a context map that identifies a plurality of transformational attributes between each discrete frame of the set of discrete frames; and c) generating, responsive to the context map, a presentation of the set of discrete frames within a display field larger than a frame size of each the discrete frame wherein the presentation includes overlapping discrete frames collectively reproducing the scene.

The image composite, which selectively includes the camera motion, as displayed by embodiments of the present invention, is received by the eye in a manner that more closely approximates how the eye would actually and naturally receive the picture in the real world as if from the point of view of the image capture device. This is partially due to not requiring the eye to spend the effort and time to interpret each frame and infer the alignment of each frame of a series of frames as conventional systems do. The alignment of the frames, which means that reference points shared (expressly or inherently) between the frames are subjected to different placement, which is perceived as jitter. Embodiments of the present invention use the reference points as anchoring attributes, which results in non-alignment of the frames themselves, thus the presentation system has a rendering area larger than any single frame.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 5(a)-FIG. 5(g) illustrate the series of frames shown in FIG. 2(a)-FIG. 2(g) rendered on an image presentation device;

Figure 7K:
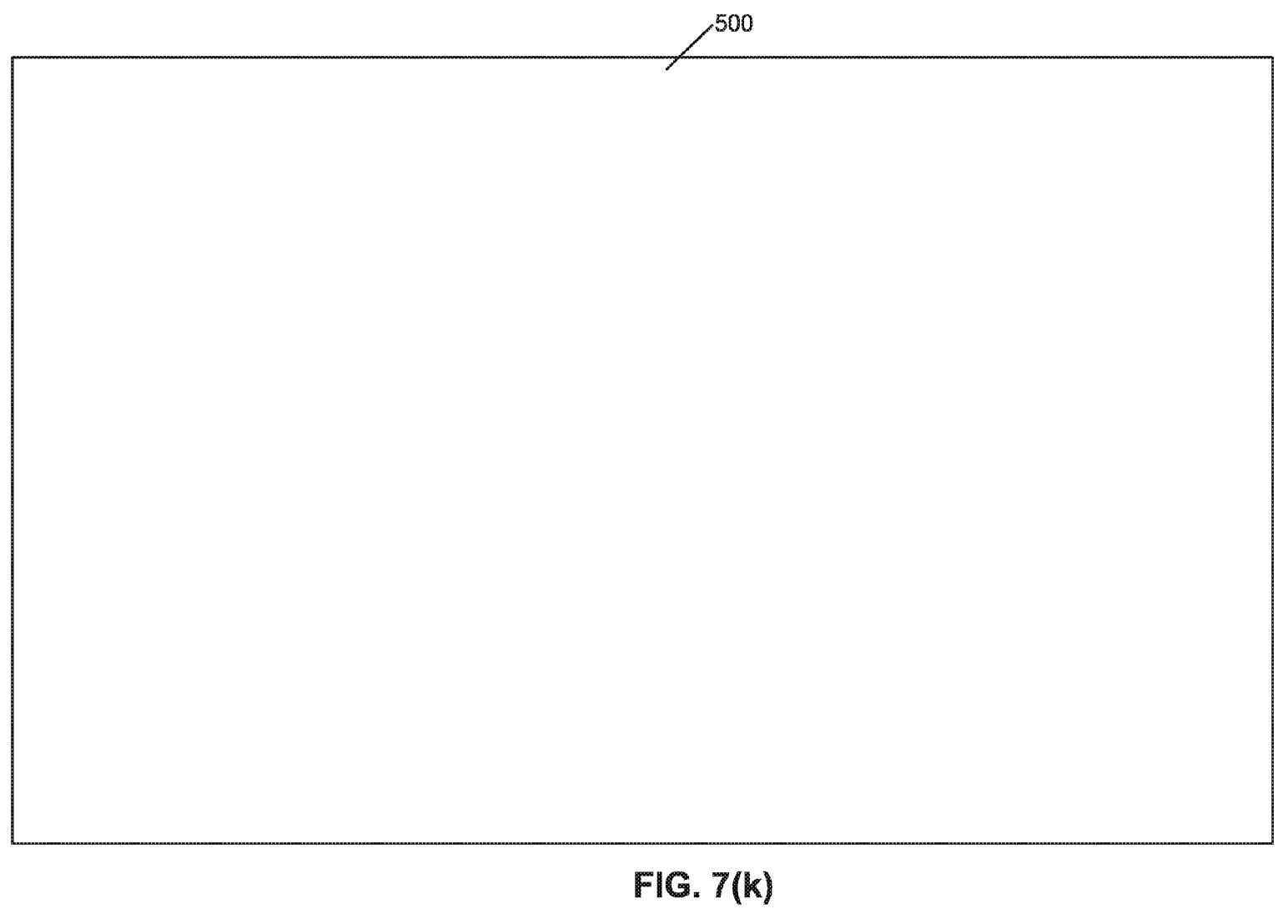

FIG. 7(a)-FIG. 7(k) illustrate the series of frames shown in FIG. 2(a)-FIG. 2(g) rendered on an image presentation device in which each individual frame has a limited dwell time;

DETAILED DESCRIPTION OF THE INVENTION

Figure 1:
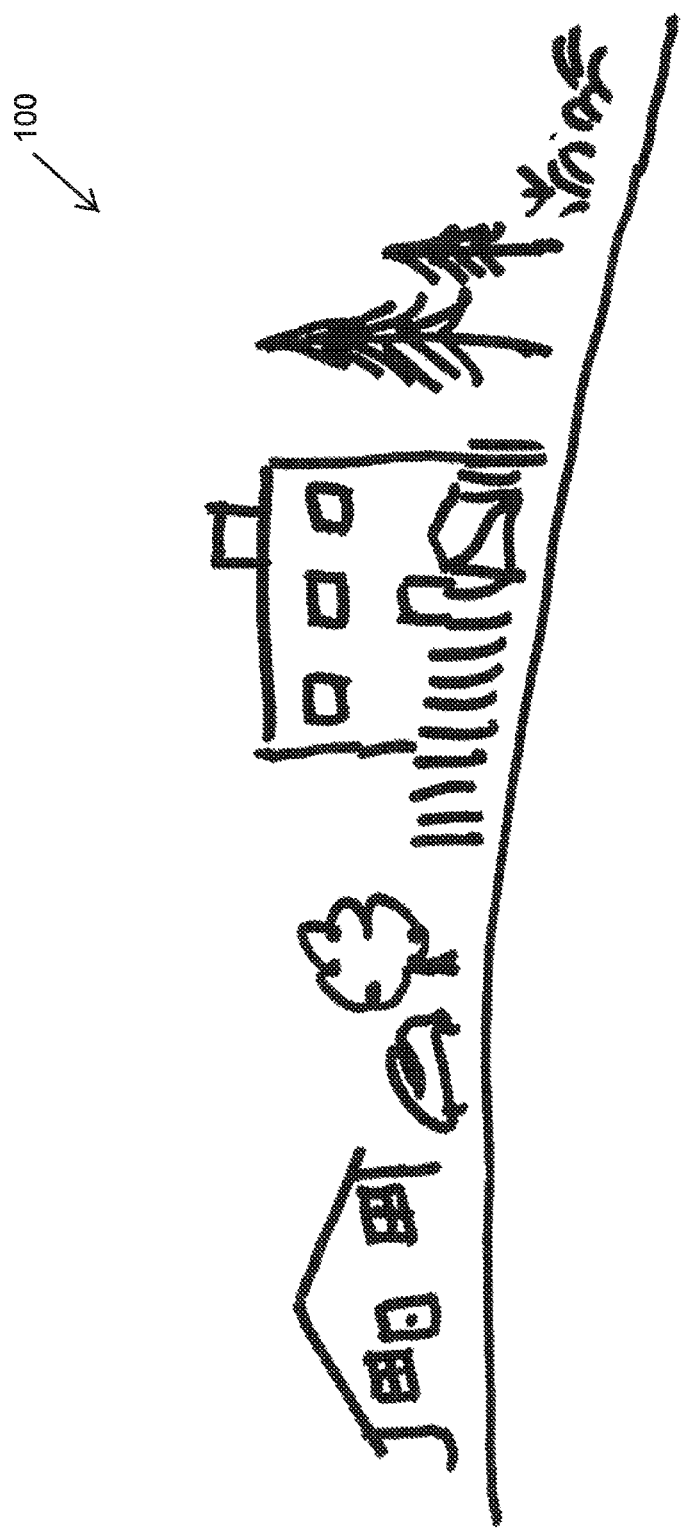
FIG. 1 illustrates a view of a representative actual scene from which a series of frames are recorded.
Figure 2A:
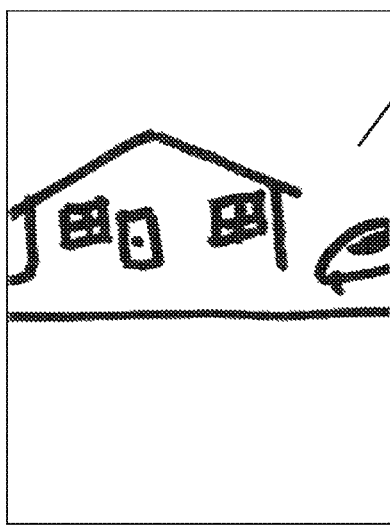
FIG. 2(a)-FIG. 2(g) illustrate individual frames of a series of frames captured from the representative actual scene of FIG. 1.
Figure 2B:
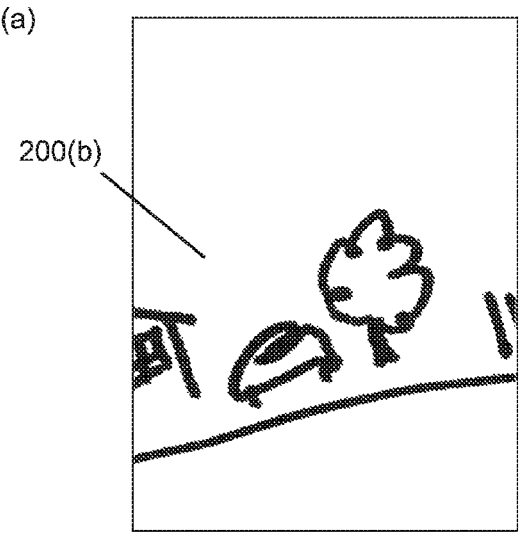
Figure 2C:
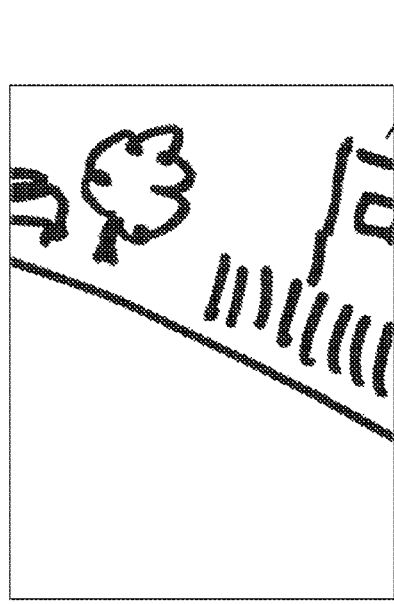
Figure 2D:
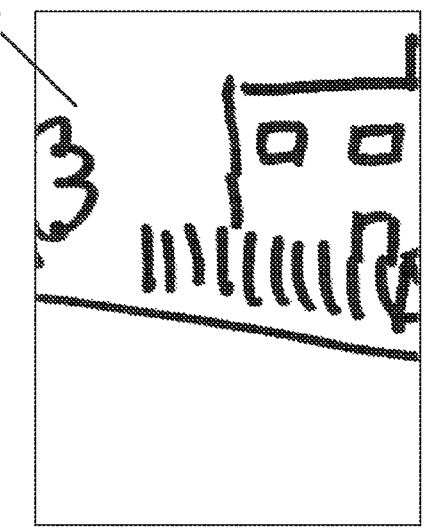
Figures 2E, 2F:
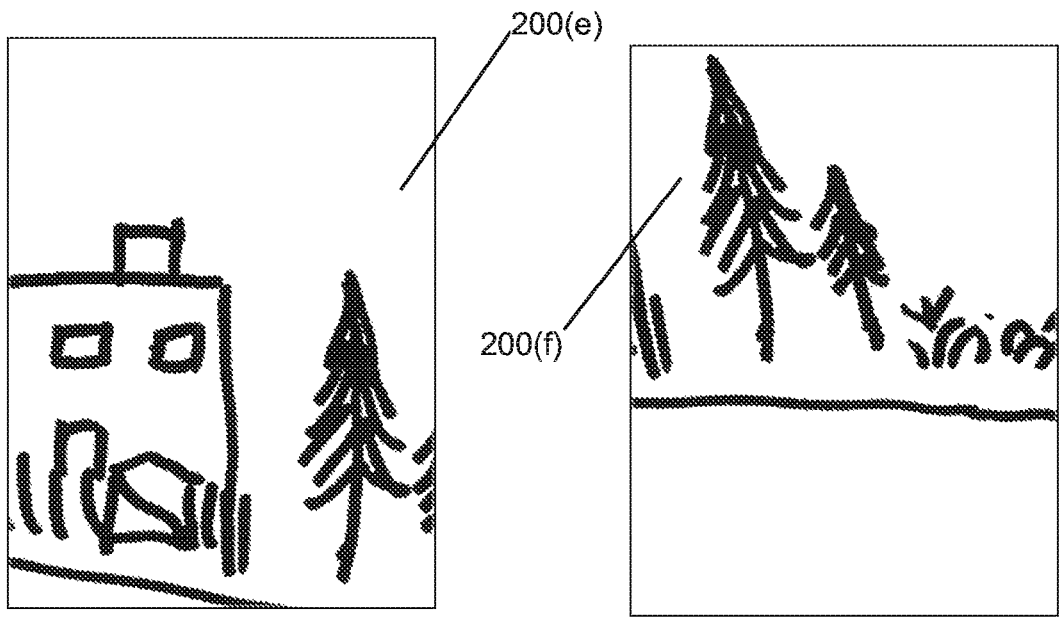
Figure 2G:
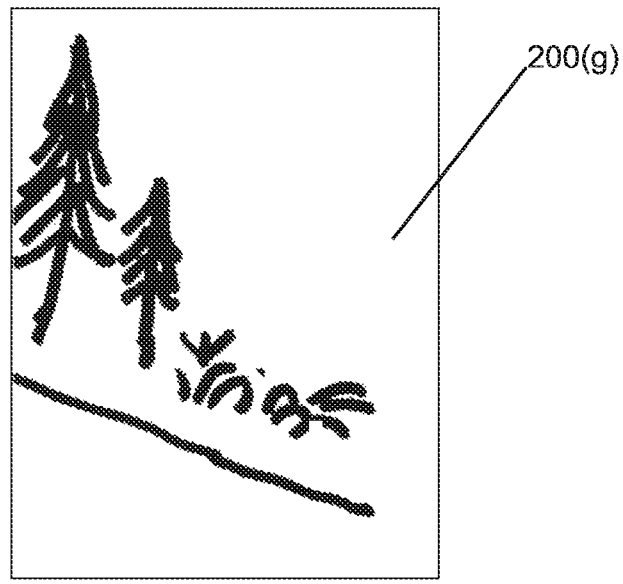
Figure 3A:
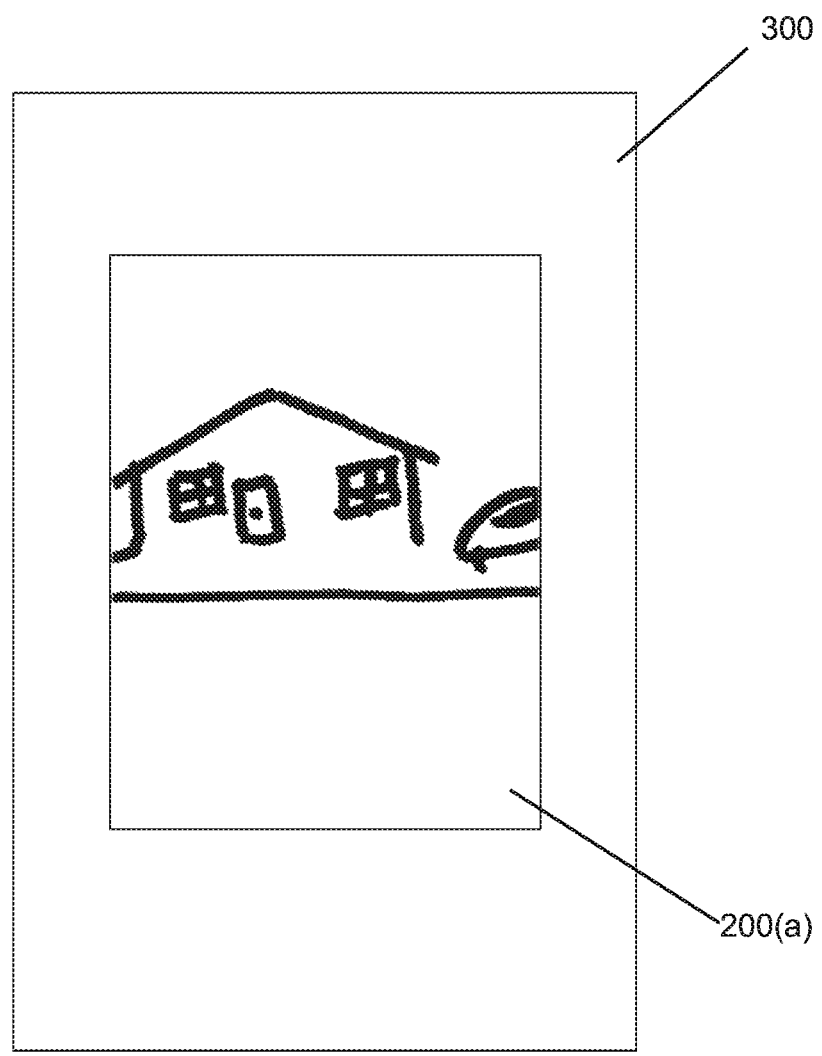
FIG. 3(a)-FIG. 3(g) illustrate the series of frames shown in FIG. 2(a)-FIG. 2(g) rendered on a player in conventional fashion.
Figure 3B:
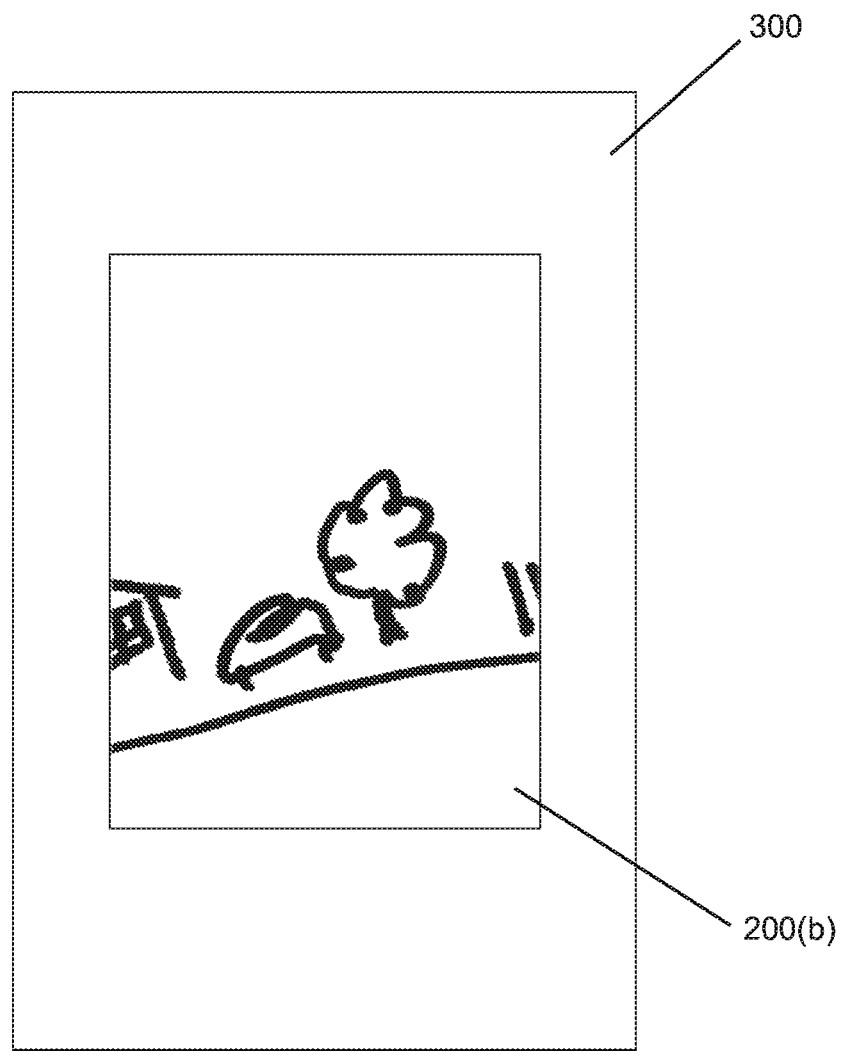
Figure 3C:
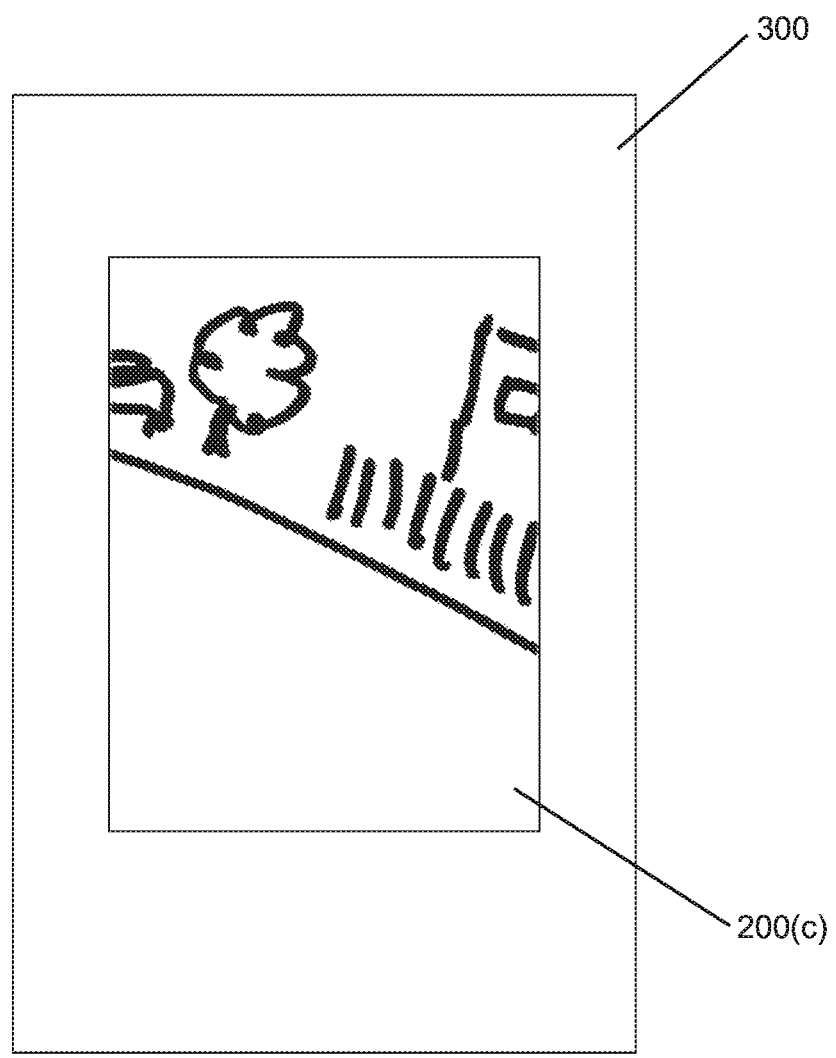
Figure 3D:
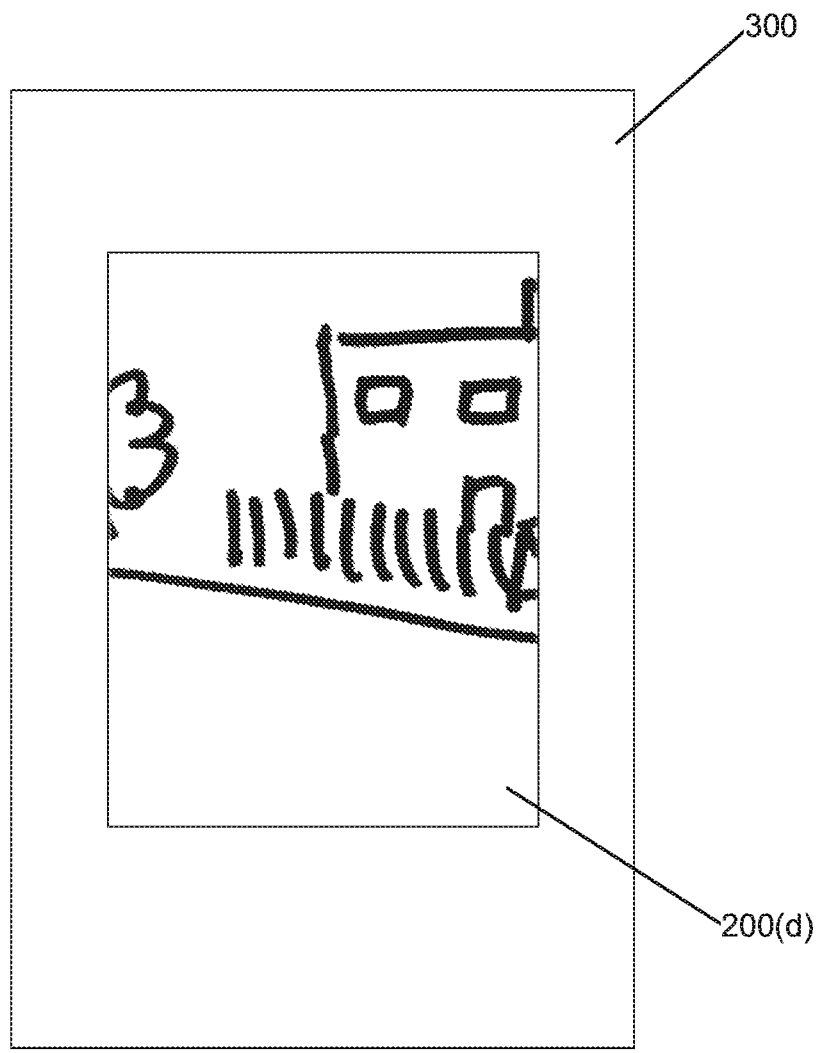
Figure 3E:
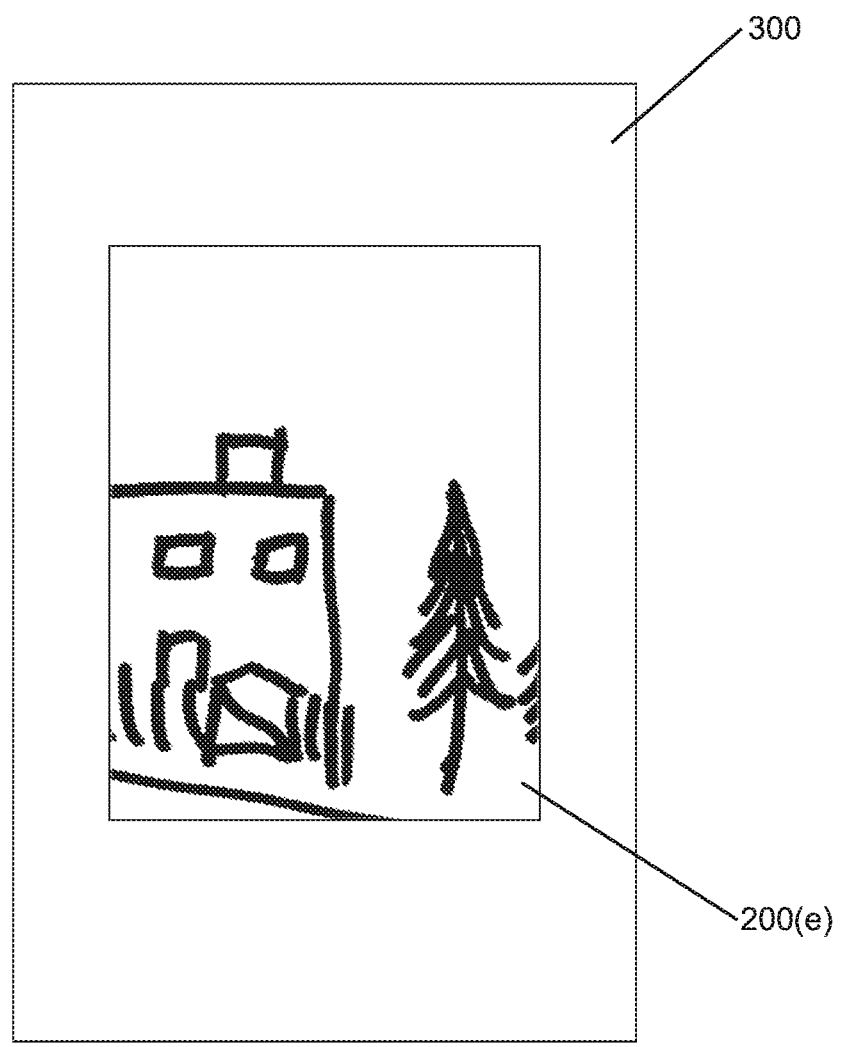
Figure 3F:
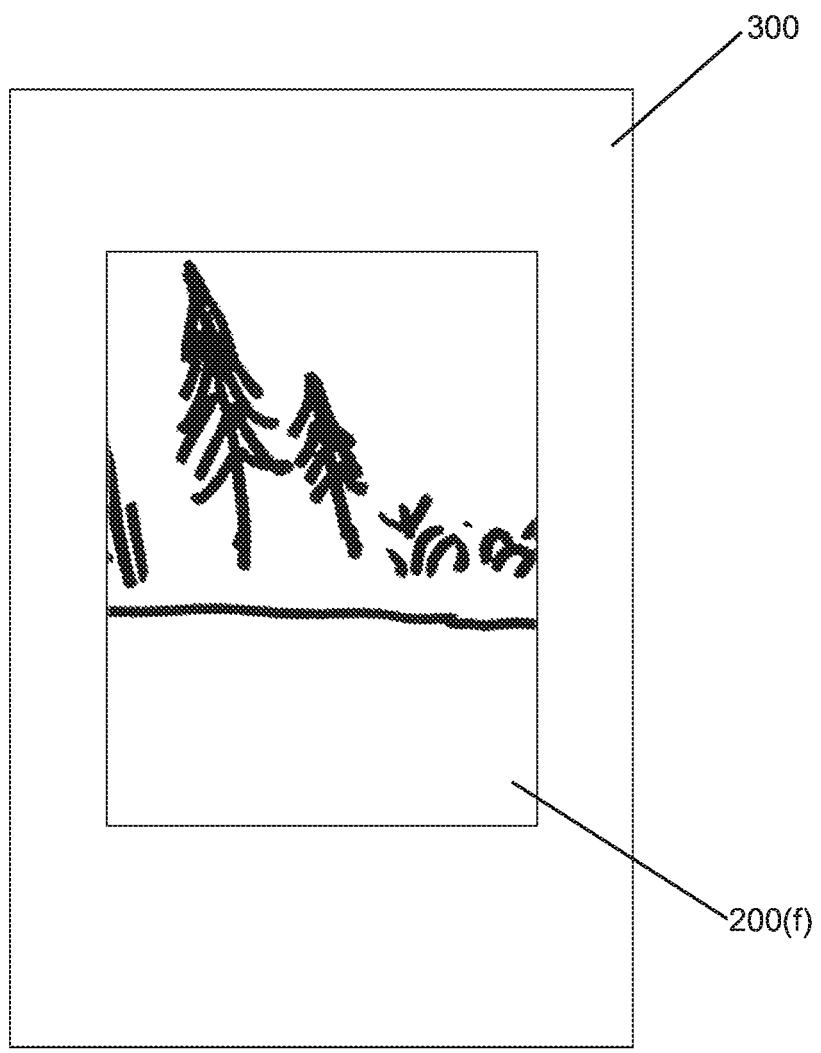
Figure 3G:
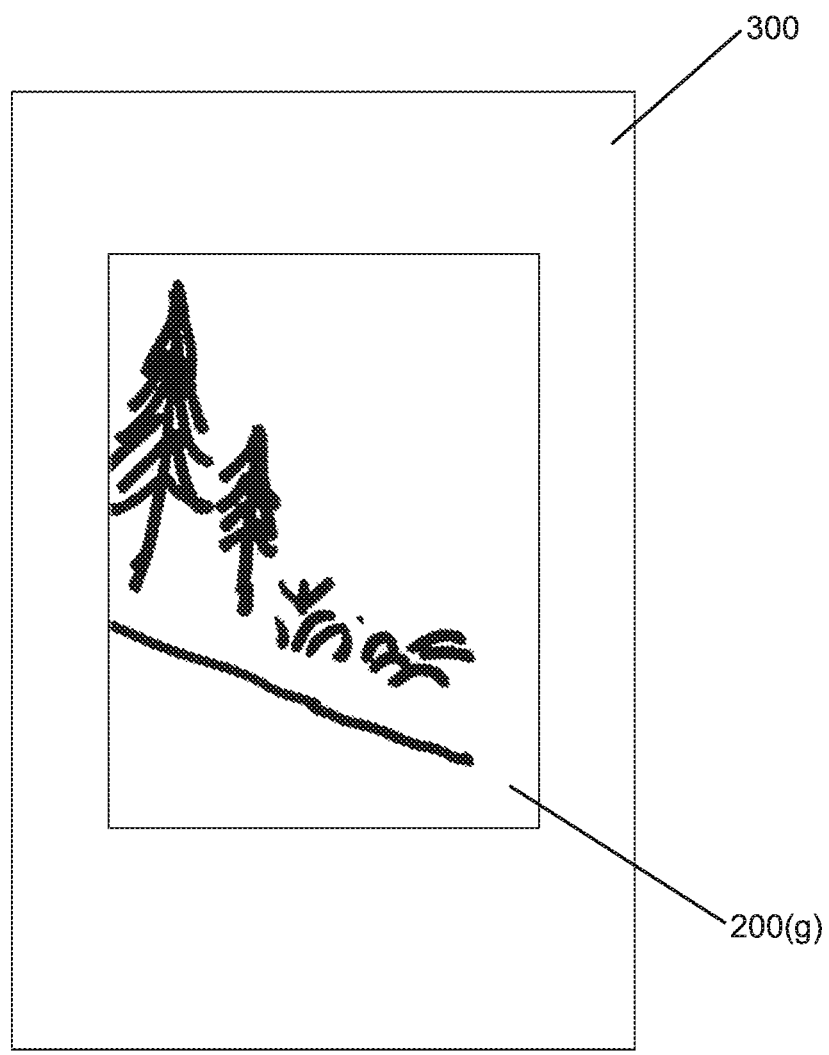

Embodiments of the present invention provide a display that simplifies presentation of related video frames to enable a user to better see and interpret videos exhibiting a high degree of localized apparent image jitter. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

For purposes of the present disclosure, the following terms have the following meanings. An actual scene refers to the real-world scene from which frames are recorded. A composite scene is a rendering of the frames in a boundless (or effectively boundless) space to produce a representation of the actual scene. A frame is one of a series of individual images comprising a sequence of images (including "video" and the like) that share a common temporal or geographic relationship, and which include one or more common anchors or reference points, some of which may be virtual and exist outside a visible content of the frame. Each frame has a perimeter, or boundary, that surrounds all or a portion of the visible content. Apparent jitter addressed by preferred embodiments of the present invention result from alignment of the frame perimeters as each frame is rendered, with the common anchor or reference points having a different relative location within the frames. A presenter renders some or all of the composite scene and preserves the relationship between selected ones of these anchors as each frame is sequentially rendered, such as by co-locating the anchoring content, which process non-aligns the frame boundaries. Video offers an inherent temporal orientation of each frame in relationship to an immediately preceding frame and an immediately following frame, and successive frames often share one or more anchor attributes (though it is not always the case that the anchors are within the visible area of one or more of the frames). Video recording of an actual scene also offers an inherent geographic orientation of the frames. Jitter, as that term is used herein, includes the effect of the discontinuous or inconsistent placement of these anchors when these frames are rendered with aligned boundaries as when displayed in a conventional display.

A display field of the presenter refers to a virtual plane upon which frames are rendered in a position, size, and orientation corresponding to the position, condition, and orientation of the imager at the actual scene when each frame was recorded. In some embodiments, one way of understanding the effect is that an initial frame is placed in the composite scene, which fixes many of the anchors and reference points, including shared anchors and reference points in frames yet to be rendered. Frames are rendered in sequence, one after another, and the position, size, orientation, and other attributes of a frame-to-be-rendered are determined by the anchors and references it includes that are shared by the frames that have been previously rendered. The frame, when rendered, matches the anchors and references, which can result in significant displacement and transformation of each frame relative to previously rendered frames. This is one reason that the composite scene is virtual and effectively boundless as the frames are appropriately positioned in an internally consistent reference frame having consistent and continuous anchors and references.

A display rectangle refers to a visible region of a display such as a computer screen, usually rectangular and fixed, in which a specific portion of the display field is displayed, and a border, boundary, reticule, or other identifying feature may be added to highlight the most-recently rendered frame. In the preferred embodiment, anchors and references are identified during compositing and a contextual map records how a frame is rendered with respect to previously rendered frames. It is also the case that anchors and references may exhibit motion or other change over time. Anchoring attributes are not necessarily static and may move, and for practical reasons, it may be necessary or desirable to define specific anchors among a series of actual frames as, in one interpretation, each actual frame may have infinitely many anchors shared by all subsequently captured images (though practically some sets of frames are viewed as independent from other sets).

FIG. 1 illustrates a view of an actual scene 100 from which a series of frames are recorded. To simplify the discussion and understanding of preferred embodiments of the present invention, actual scene 100 is shown as a panorama view of a landscape having static anchors. The present invention is not limited to such environments as it is applicable to fully dynamic environments as well as hybrid environments including both static and dynamic elements. In some cases, an anchor reference or references for the actual scene will be static (such as with the landscape depicted in actual scene 100) or may be dynamic, such as use of a motive element (e.g., an overhead plane, a boat, an animal, a bicyclist, and the like) about which the user centers the frames while recording the motive element panning across other static or dynamic elements). It is not always the case that an anchor reference exists within the visible portion of any frame, embodiments of the present invention may, in appropriate cases, use non-visible anchoring attributes (e.g., positional information like longitude/latitude, gyroscopic, accelerometer, and other absolute or relative coordinate development models).

FIG. 2(a)-FIG. 2(g) illustrate individual frames 200(a)-200(g) of a series of frames captured from actual scene 100 shown in FIG. 1. Each frame $200_x$ is a portion of actual scene 100 recorded using an imager, such as a camera, video recorder, or the like, to record a panoramic scan of the landscape. Each frame $200_x$ includes a fixed rectangular profile determined by the imager having a content that is affected by optical and mechanical characteristics of the imager as well as mechanical conditions of the operator as the frames are recorded. For example, many imagers have scaling (e.g., zoom) options and the relative relationship between actual scene 100 and an instantaneous field-of-view of the imager when frame $200_x$ is recorded will result in non-uniform relative transitions when reconstructing the series of frames according to the temporal/geographical context. For each frame $200_x$, the imager may be tilted or rotated differently, held at a different height, or taken from a different vantage point. For example, the operator may be running and changes in the absolute and relative field-of-view due to motion of the videographer and of the imager are superimposed over the desired target of the series of frames, which itself may be rapidly changing. The collective aggregation of motion superimpositions can produce a chaotic series of images when played back using a conventional system because the fixed rectangular profiles are what is typically aligned during rendering in a conventional system which causes the discontinuous motions (e.g., jitter) of identifiable features (which can serve as anchor). Embodiments of the present invention help to smooth out all these motions by rendering frames with anchors having a predefined relationship to each other (typically co-located) and allowing the fixed rectangular profile to be non-aligned with other frames.

Each imaged instantaneous field-of-view is captured in the rectangular frame which captures both the intended frame element as well as the superimposed imager effect. When played back using a conventional player, the series of frames are presented in a rectangular display configured to show each frame as it was captured, but normalized to the orientation of the player. This is what imparts the apparent jitter to the image as the anchor locations between successive rendered frames is not preserved. Actual scene 100 is not (under normal circumstances) shaking but the artifice of the capturing and rendering in conventional manner superimposes the motion of the imager onto frames $200_x$ so that, in the conventional player, there is apparent jitter when rendering frames $200_x$. As discussed above, the conventional solution is to attempt to compensate and neutralize the jitter which solution is designed to smooth out the field-of-view distortions, but which also eliminates some of the information contained within the sequence, for example, the motion of the imager. In some conventional systems, stabilizers (and stabilizer processes applied to a series of captured images) intentionally put to waste portions of the original full field of view by cropping the frames enough to assemble the finished (stabilized and lower resolution) frame from inside a full (unstabilized) frame.

FIG. 3(a)-FIG. 3(g) illustrate frames 200(a)-200(g) shown in FIG. 2(a)-FIG. 2(g) rendered on a player 300 in conventional fashion. Each portion of actual scene 100 captured in any particular frame $200_x$ is rendered in normalized fashion to the orientation of player 300 which imparts apparent jitter in response to changes in the field-of-view and other imaging parameters when the content of the respective frame $200_x$ is recorded. The viewer is then subjected to the jitter as they view the rendered aligned frames $200_x$ in player 300.

Figure 4:
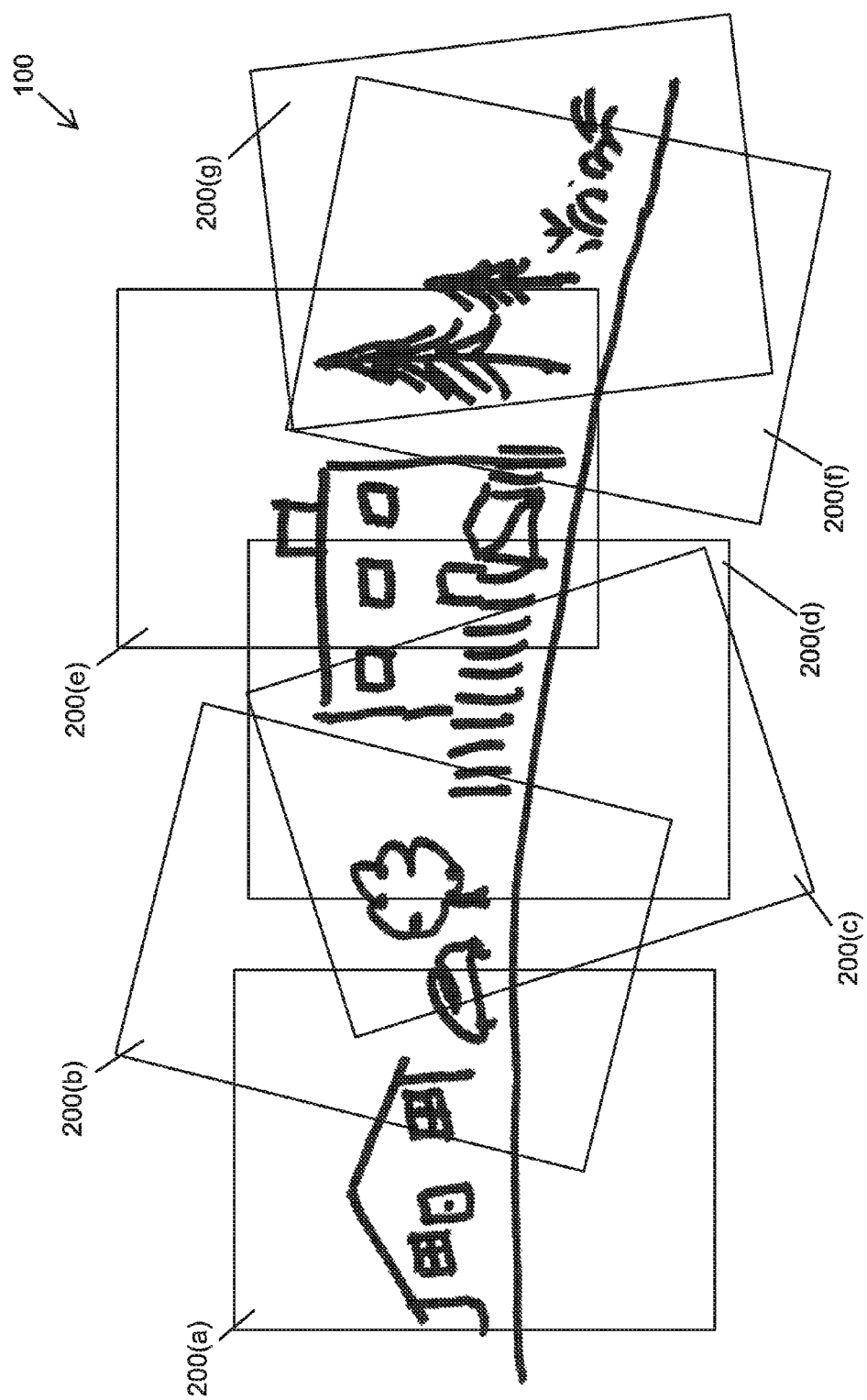
FIG. 4 illustrates a parsing of the representative actual scene to produce the individual frames of the series of frames illustrated in FIG. 2(a)-FIG. 2(g) and FIG. 3(a)-FIG. 3(g)

FIG. 4 illustrates a parsing of actual scene 100 illustrating the orientation and positioning of frames $200_x$ illustrated in FIG. 2(a)-FIG. 2(g) and FIG. 3(a)-FIG. 3(g). The orientation and positioning of frames $200_x$ is simplified in that only rotational and displacement transformations are included. In other implementations, the transformations may include scaling and skewing/distortions that would make illustration more complicated to demonstrate and visualize (and require additional processing to composite as further described below) without further adding to an understanding of the present invention.

FIG. 5(a)-FIG. 5(g) illustrate the series of frames shown in FIG. 2(a)-FIG. 2(g) rendered on an image presentation device 500. Image presentation device 500 provides an enhanced display area that is larger than the physical dimensions of each frame $200_x$. FIG. 5(a)-FIG. 5(g) render each frame $200_x$ on image presentation device 500 within a virtual space that encompasses the expanse of the entire series of frames, and each frame $200_x$ is rendered in relative context to frames $200_x$ that have been previously rendered, and as is further explained herein, using a meta-context map to position each frame $200_x$ on image presentation device 500. FIG. 5(a)-FIG. 5(g) illustrate use of a 100% dwell (e.g., frame 200 persistence) wherein each frame $200_x$ remains rendered on image presentation device 500 as additional successive frames $200_x$ are added.

Figure 5A:
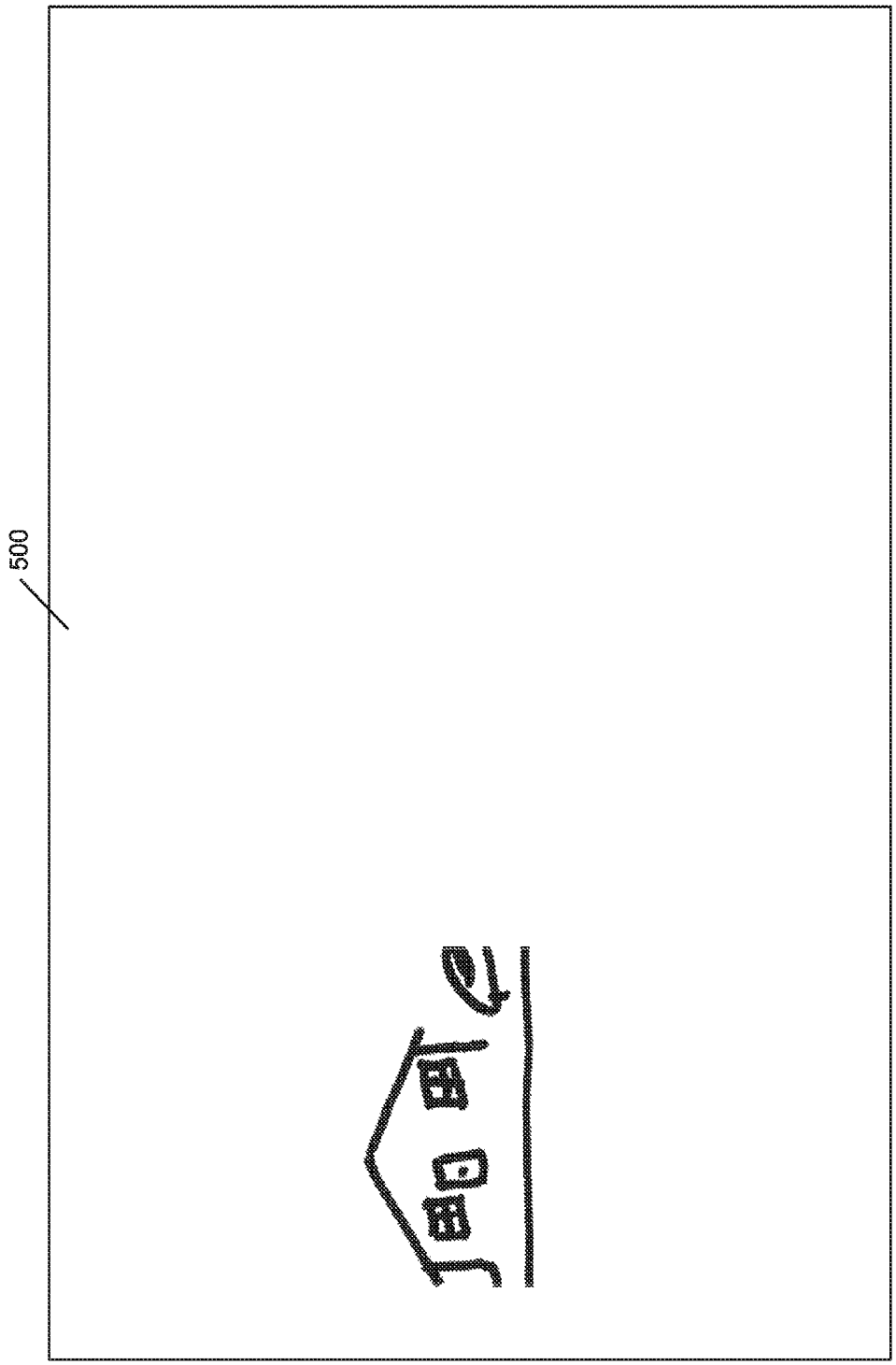
Figure 5B:
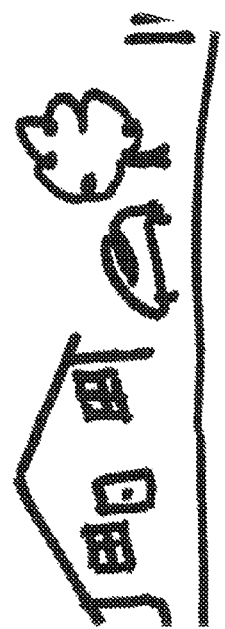
Figure 5C:
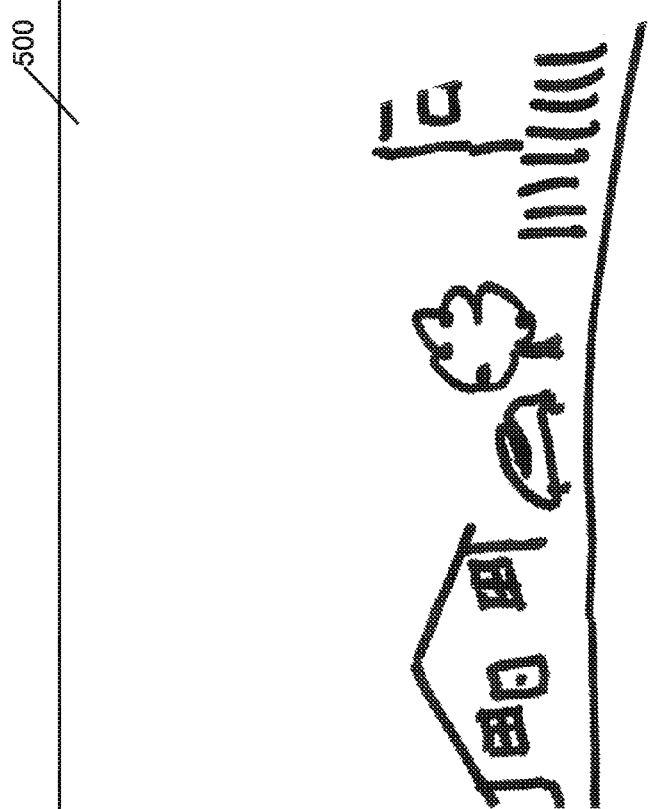
Figure 5E:
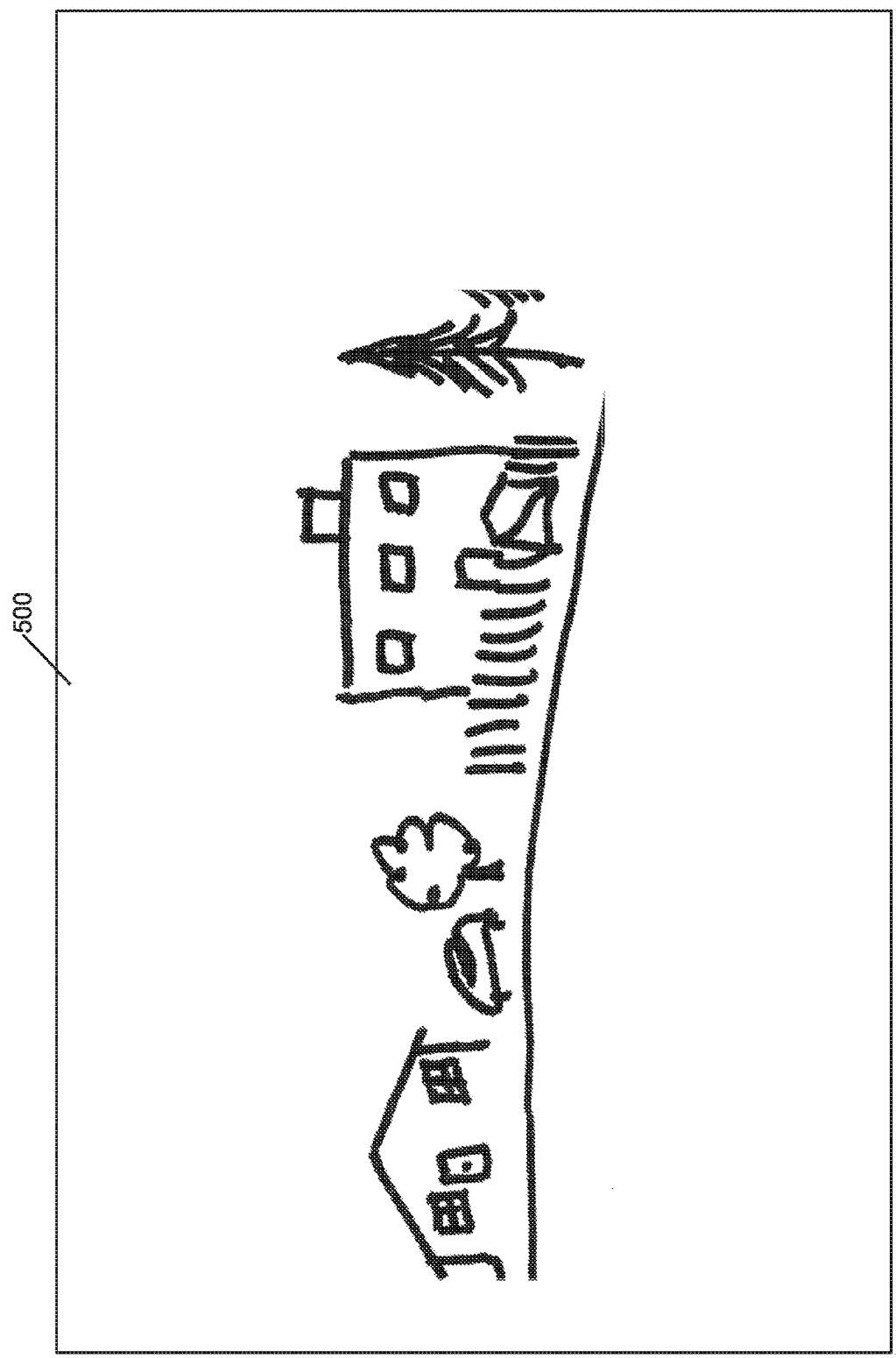
Figure 5F:
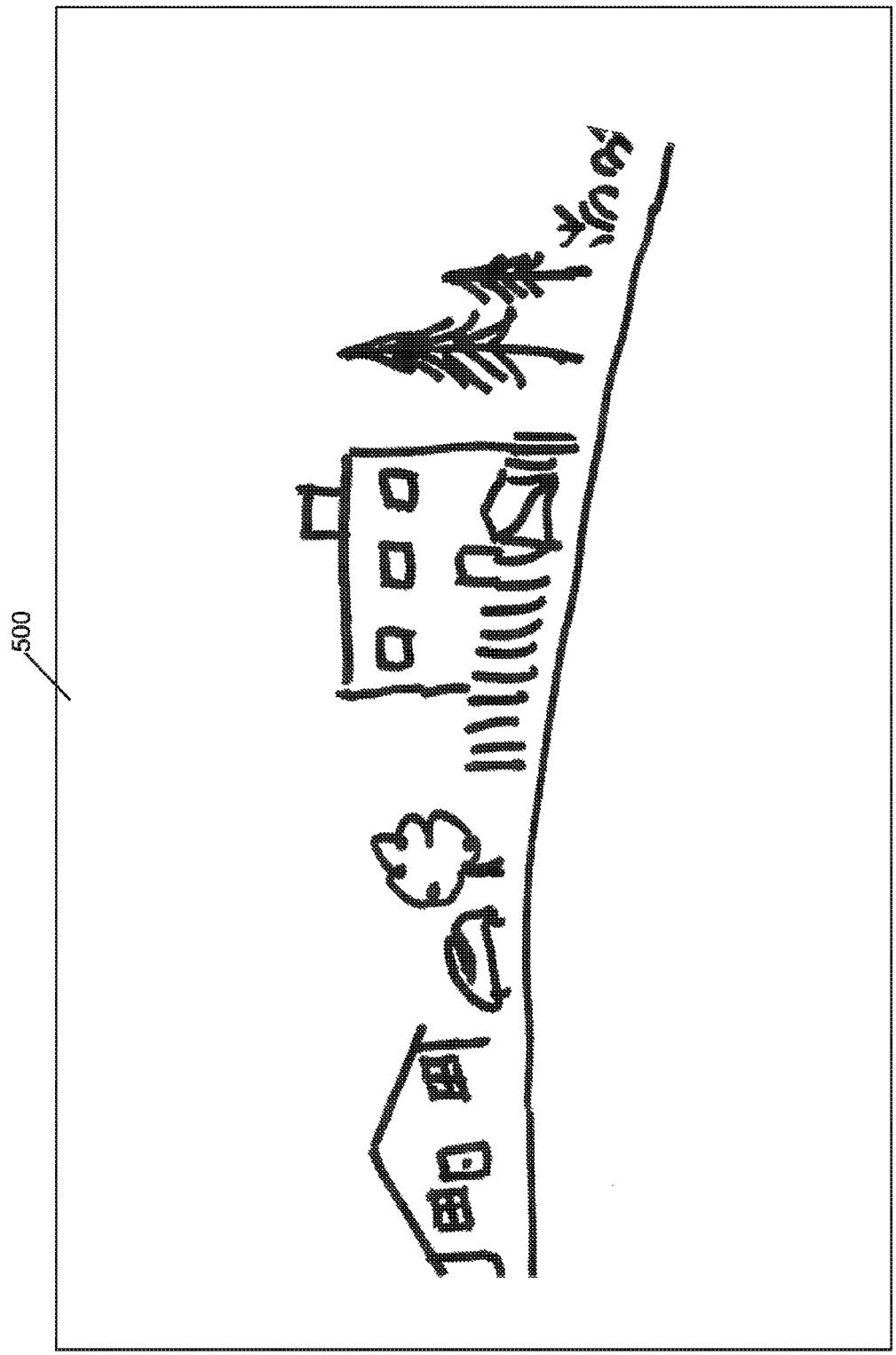
Figure 5G:
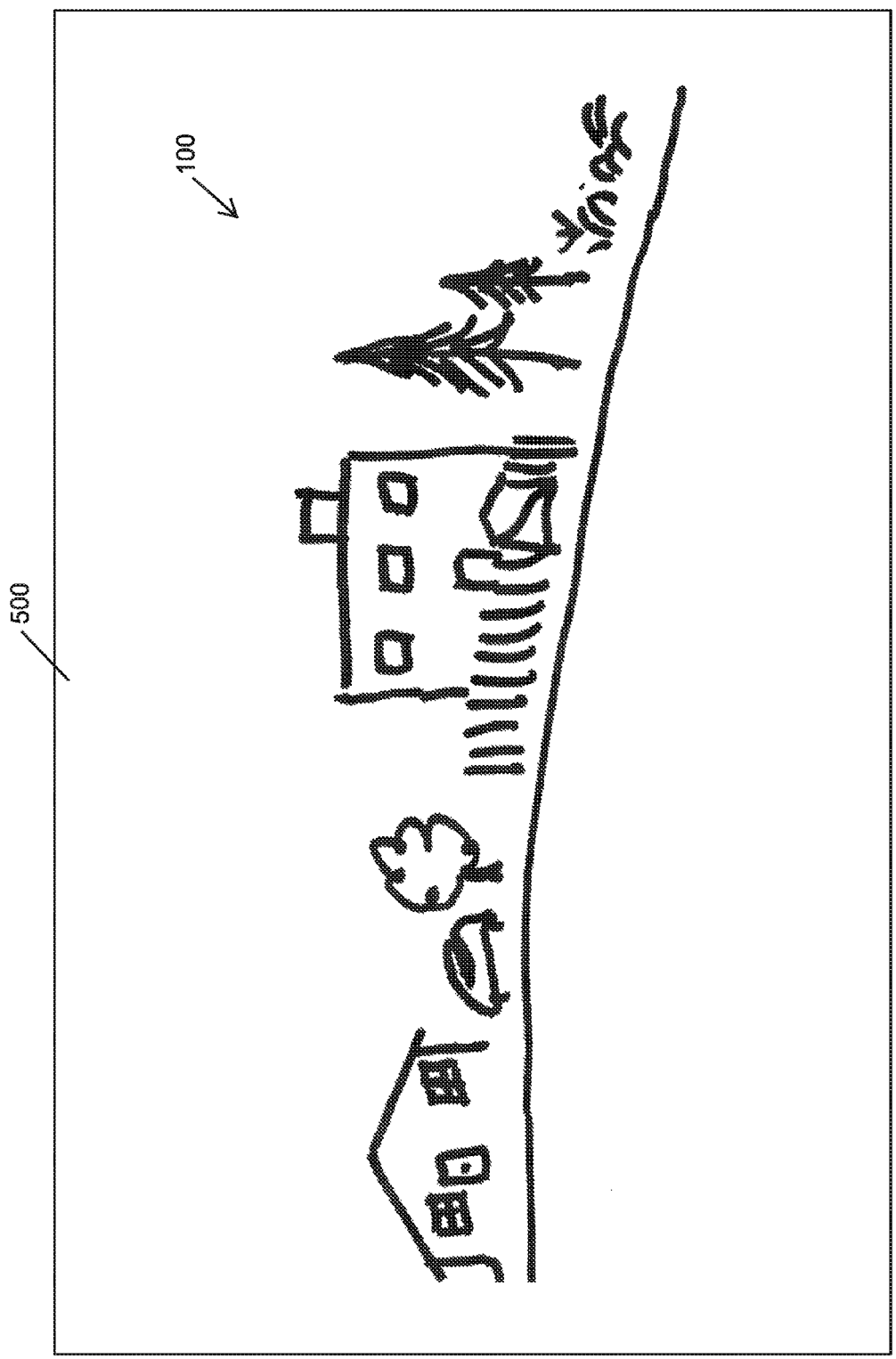

FIG. 5(a) illustrates a rendering of frame 200(a) on image presentation device 500. FIG. 5(b) illustrates a rendering of new frame 200(b) and previously rendered frame 200(a) on image presentation device 500. FIG. 5(c) illustrates a rendering of new frame 200(c) and previously rendered frames 200(a)-200(b) on image presentation device 500. FIG. 5(d) illustrates a rendering of new frame 200(d) and previously rendered frames 200(a)-200(c) on image presentation device 500. FIG. 5(e) illustrates a rendering of new frame 200(e) and previously rendered frames 200(a)-200(d) on image presentation device 500. FIG. 5(f) illustrates a rendering of new frame 200(f) and previously rendered frames 200(a)-200(e) on image presentation device 500. FIG. 5(g) illustrates a rendering of new frame 200(g) and previously rendered frames 200(a)-200(f) on image presentation device 500, in which actual scene 100 is reproduced (because of the 100% dwell). In some embodiments, it is desirable to provide some indicator, for example a reticule or border, of a perimeter of the most recently rendered frame $200_x$, or provide some other mechanism (e.g., a change in intensity or other display property of the most recently rendered frame such as may suggest a flash of operating a light-source often associated with image capture) to highlight the appearance of new content. In this way such an indicator provides a context of the currently referenced image and/or aids the view by providing an eye-catching "follow along" indication as a guide to make it easier for the viewer, particularly advantageous when synchronizing with audio but useful in other contexts as well. In other implementations, it is desirable to build a border that includes an outline perimeter of all currently rendered frames $200_x$ within image presentation device 500. In some implementations, both an indicator and a border are used. Rendering of frame 200(a)-frame 200(g) is relatively easy in this case since content alignment attributes (e.g., the common anchors and shared references and the like) are visible in consecutive frames.

In the preferred embodiment, apparent jitter is "absorbed" by locating each frame $200_x$ at the proper relative location to other frames $200_x$, with the indicator providing a virtual jitter as it rotates and translates and otherwise shifts during rendering of successive frames. Preferred embodiments of the present invention allow the system to manage this apparent jitter in new-found ways, for example the system may enable some jitter to be depicted by actually distorting the location and orientation of anchors of individual frames $200_x$ during rendering to deviate from their parsed locations and orientations. This enables the system to manage how much of the dynamic meta-motion of the imager (previously classified as apparent jitter) to pass on to the viewer as for some series the meta-motion imparts energy as it more accurately conveys information relating to the imaging process. (For example, a videographer that is running to escape some peril.) Allowing image presentation device 500 to impart a desired quantity of the jitter onto frame $200_x$ when rendering location/orientations allows the producer and/or the viewer to manage the jitter without it being too distracting and interfering with absorption of the overall message. Induced jitter is recreated or enabled by displacing content alignment attributes from actual locations during rendering.

Figure 6:
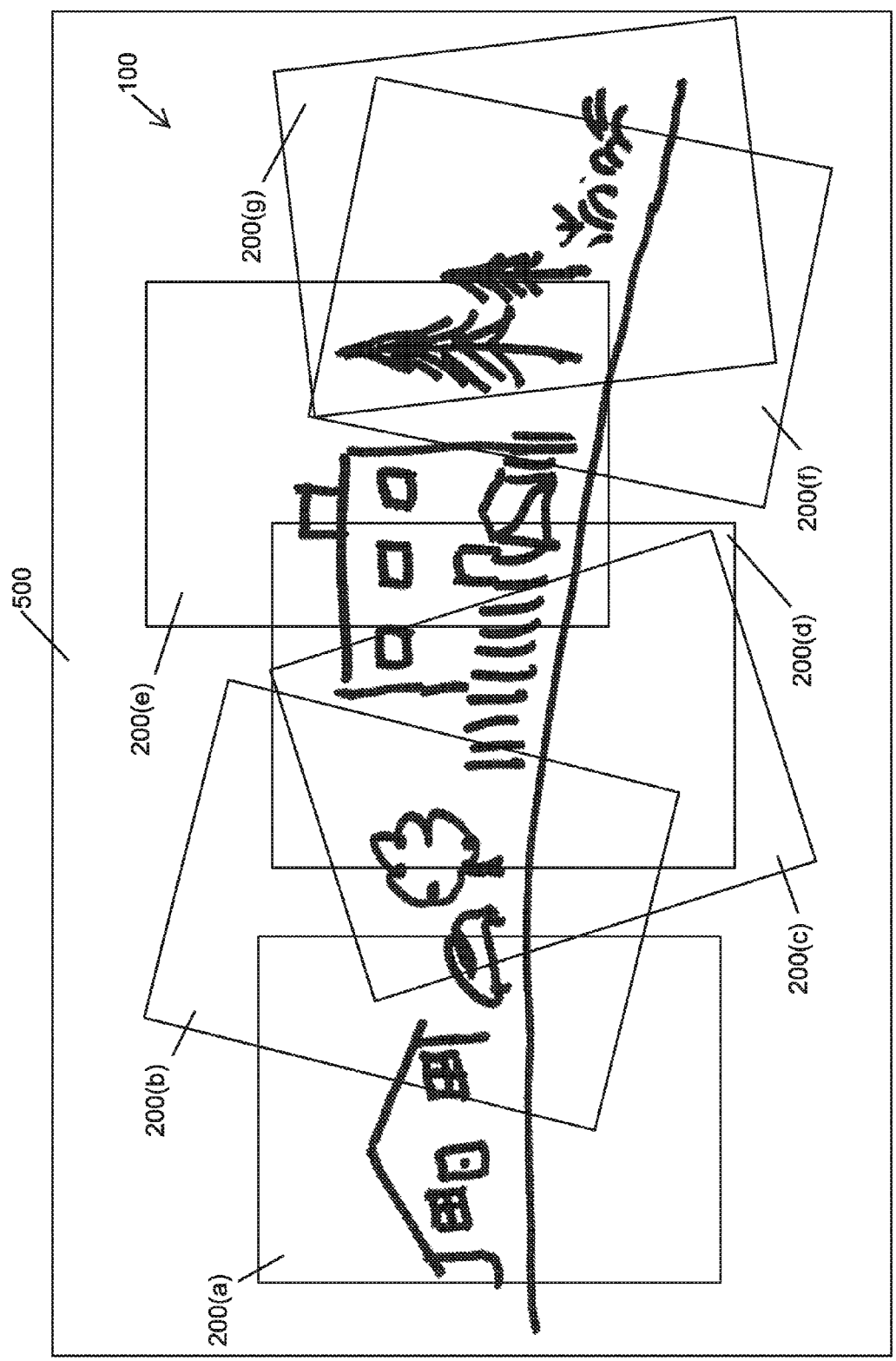
FIG. 6 illustrates a parsing of the representative actual scene to produce the individual frames of the series of frames illustrated in FIG. 2(a)-FIG. 2(g) and FIG. 5(a)-FIG. 5(g)
Figure 7B:
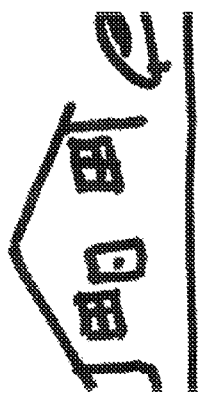
Figure 7C:
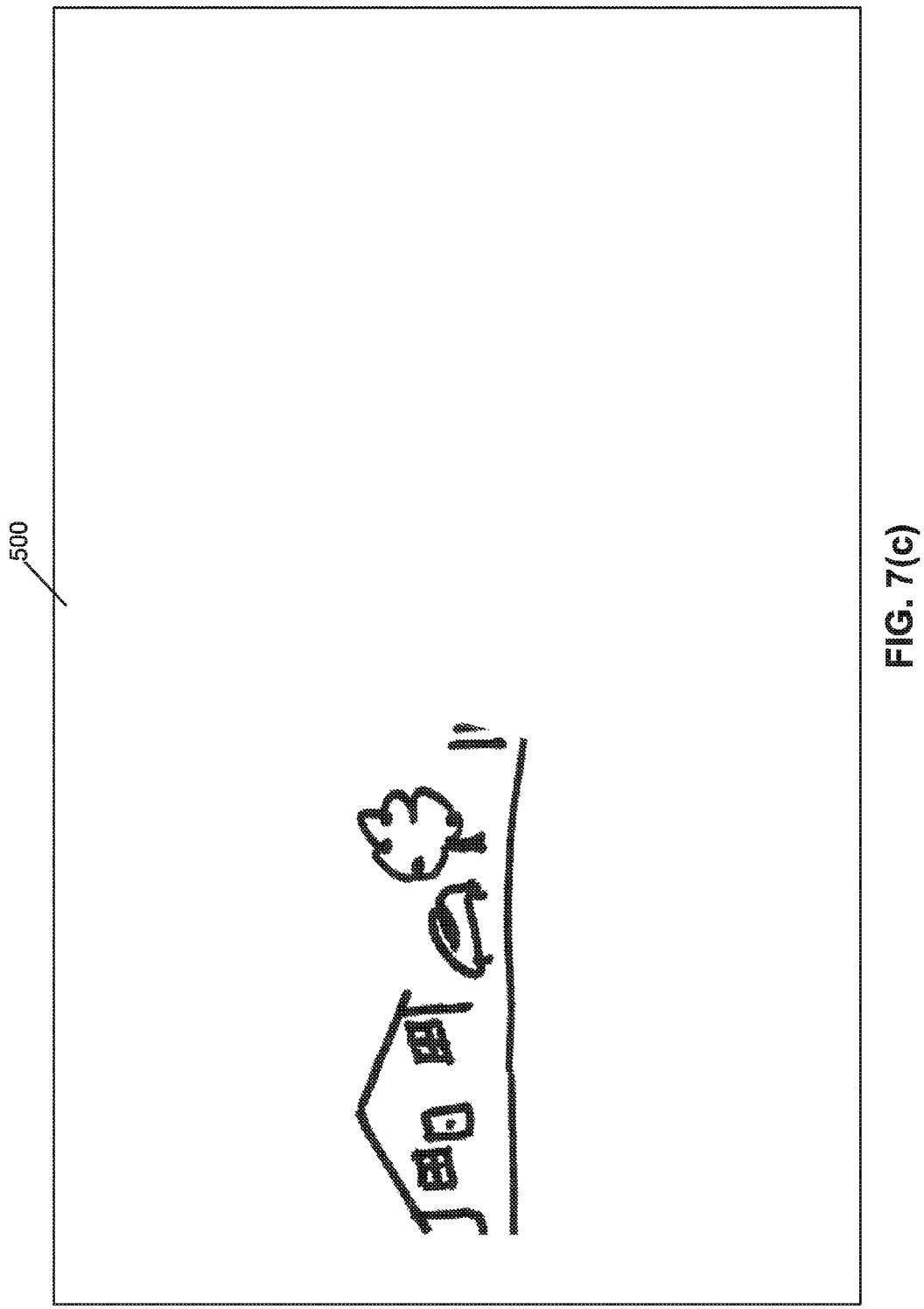
Figure 7D:
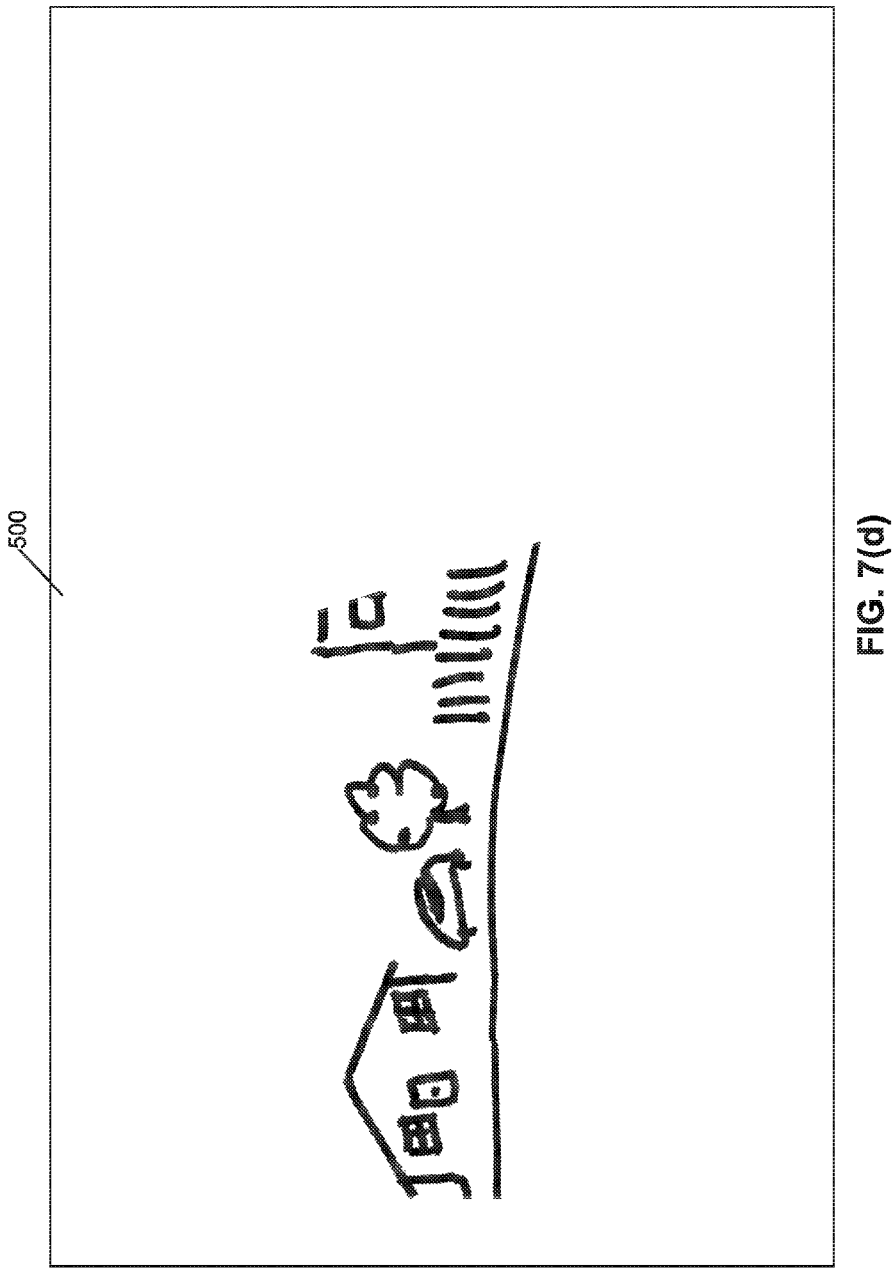
Figure 7E:
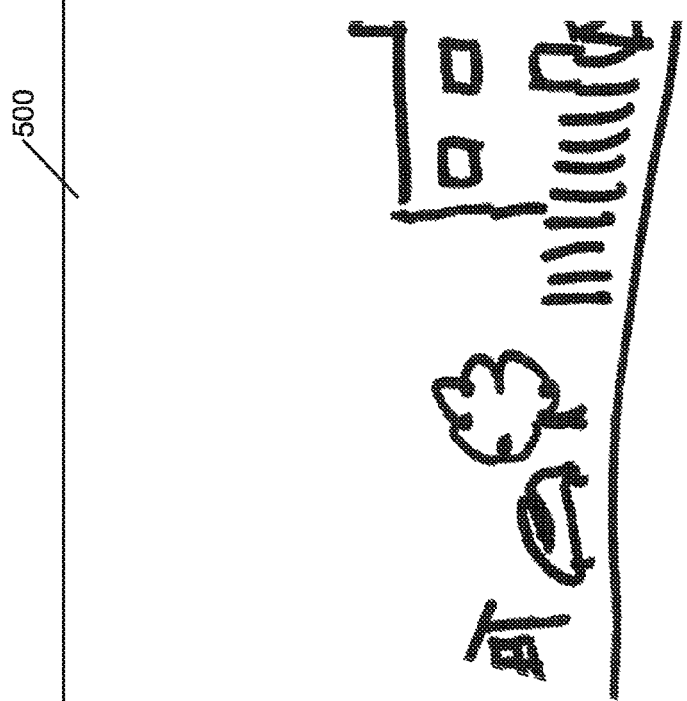
Figure 7G:
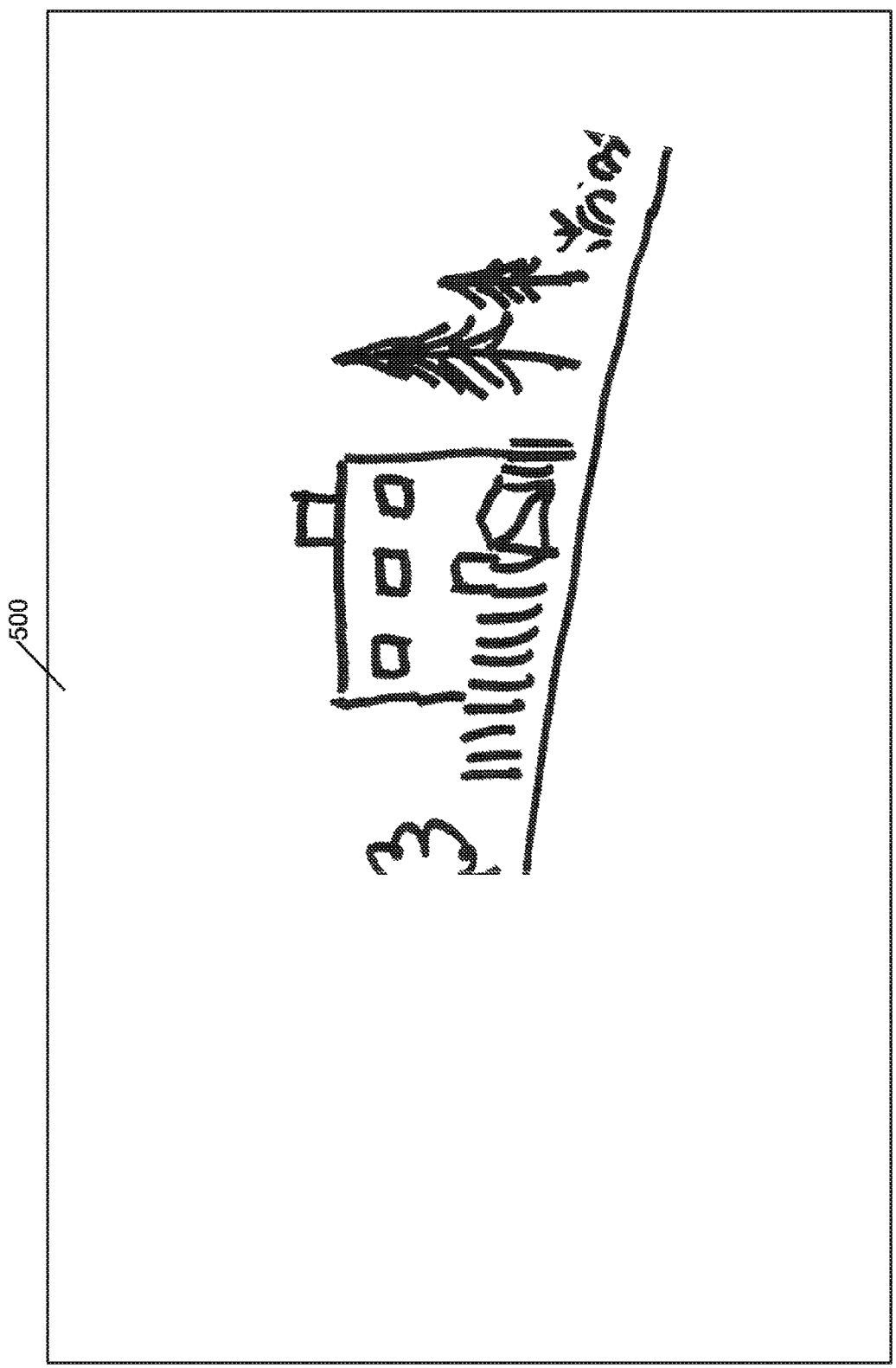
Figure 7H:
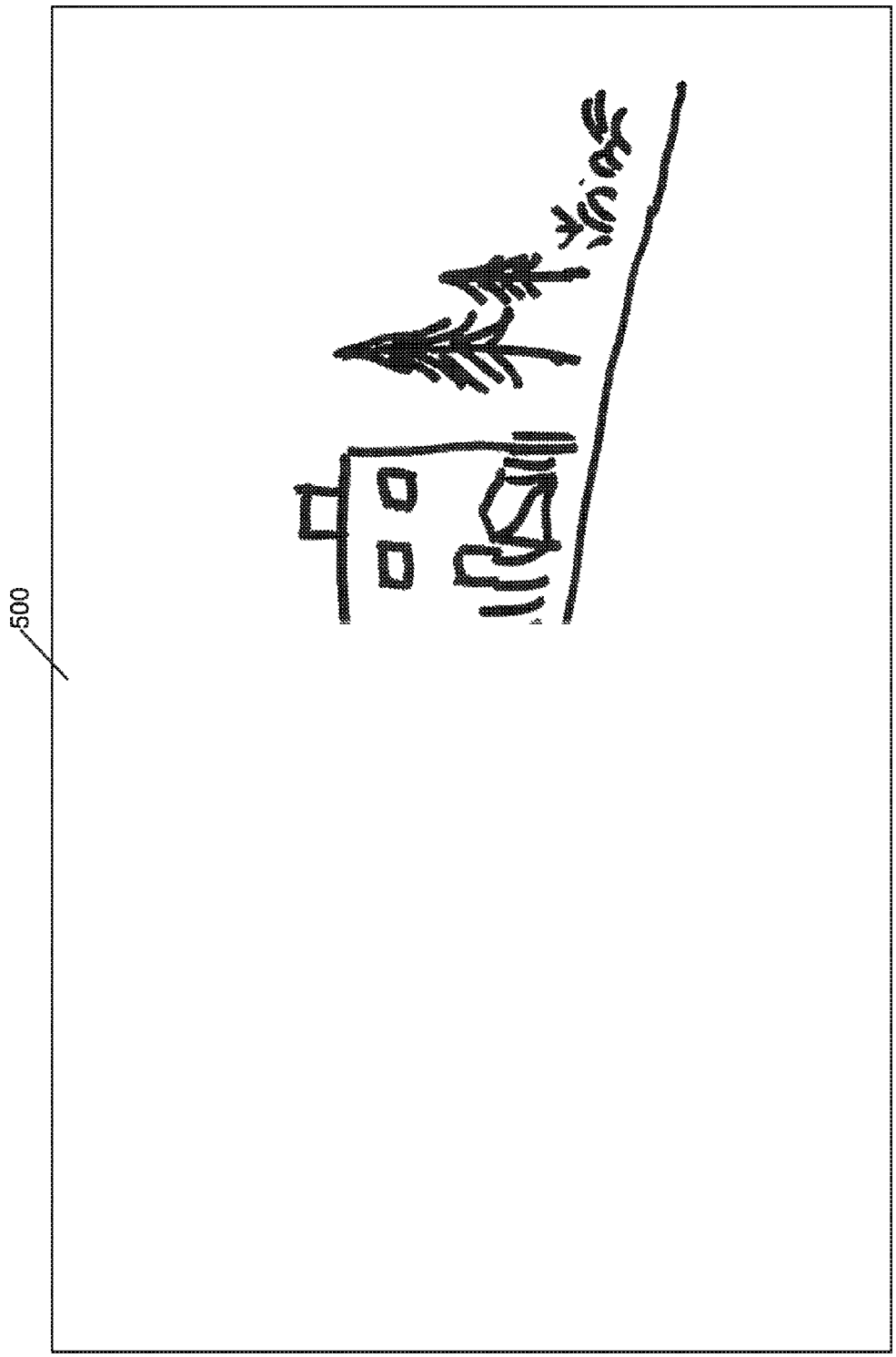
Figure 7J:
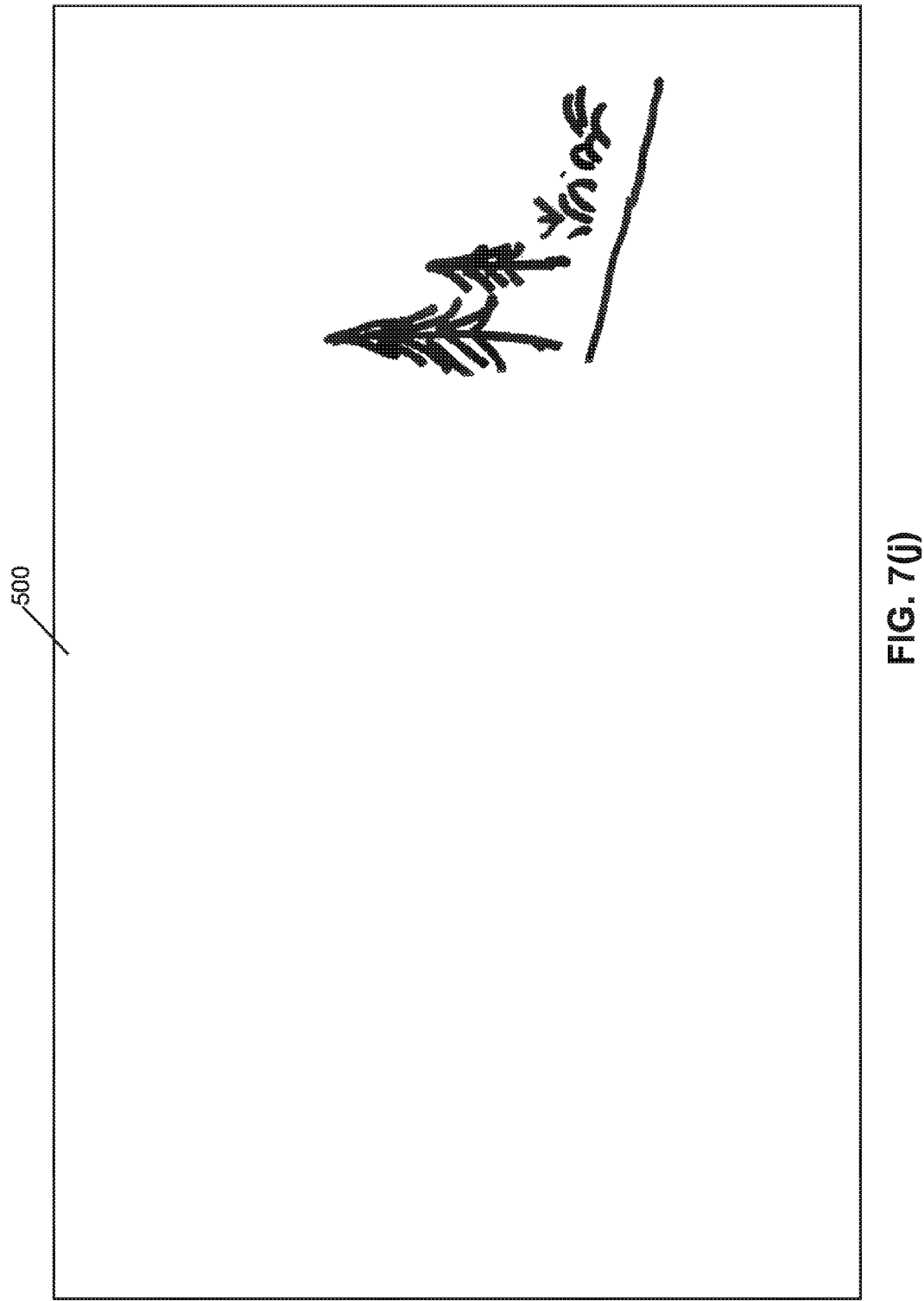

FIG. 6 illustrates a match between the parsing of actual scene 100 and rendering of frames $200_x$ in their proper location and orientation to reproduce actual scene 100 from the individual frames of the series of frames illustrated in FIG. 2(a)-FIG. 2(g). In some embodiments of the present invention, an aggregation of the locations, sizes, and orientations of frames $200_x$ serve as a context map.

FIG. 7(a)-FIG. 7(k) illustrate the series of frames shown in FIG. 2(a)-FIG. 2(g) rendered on an image presentation device in which each individual frame has a limited dwell time. In these illustrations, when a frame has been rendered for the indicated period, it is dropped. Thus the frame appears suddenly, persists for the dwell time, and then disappears suddenly as it dropped. In some embodiments, it may be that the appearance and/or the disappearance occur gradually, as in a fade-in or fade-out of the frame or frames (as the effect may extend over several frames), and the fade-in and fade-out times need not be the same.

FIG. 7(a)-FIG. 7(k) illustrate the series of frames shown in FIG. 2(a)-FIG. 2(g) rendered on an image presentation device 500. Image presentation device 500 provides an enhanced display area that is larger than the physical dimensions of each frame 200x. FIG. 7(a)-FIG. 7(k) render each frame $200_x$ on image presentation device 500 within a virtual space that encompasses the expanse of the entire series of frames, and each frame $200_x$ is rendered in relative context (e.g., responsive to one or more shared anchors) to frames $200_x$ that have been previously rendered, and as is further explained herein, using a meta-context map to position each frame $200_x$ on image presentation device 500. FIG. 7(*a*)- FIG. 7(*k*) illustrate use of a 3-frame dwell (e.g., a particular frame $200_i$ persists for the time taken to render 3 frames) wherein each frame $200_x$ remains rendered on image presentation device 500 for a limited time as additional frames $200_x$ are added.

FIG. 7(*a*) illustrates a blank image presentation device 500 prior to any rendering of any frame $200_x$. FIG. 7(*b*) illustrates a rendering of frame 200(*a*) on image presentation device 500. FIG. 7(*c*) illustrates a rendering of new frame 200(*b*) and previously rendered frame 200(*a*) on image presentation device 500. FIG. 7(*d*) illustrates a rendering of new frame 200(*c*) and previously rendered frames 200(*a*)-200(*b*) on image presentation device 500. FIG. 7(*e*) illustrates a rendering of new frame 200(*d*) and previously rendered frames 200(*b*)-200(*c*) on image presentation device 500 (frame 200(*a*) is no longer rendered). FIG. 7(*f*) illustrates a rendering of new frame 200(*e*) and previously rendered frames 200(*c*)-200(*d*) on image presentation device 500 (frames 200(*a*)-200(*b*) are no longer rendered). FIG. 7(*g*) illustrates a rendering of new frame 200(*f*) and previously rendered frames 200(*d*)-200(*e*) on image presentation device 500 (frames 200(*a*)-200(*c*) are no longer rendered). FIG. 7(*h*) illustrates a rendering of new frame 200(*g*) and previously rendered frames 200(*e*)-200(*f*) on image presentation device 500 (frames 200(*a*)-200(*d*) are no longer rendered). FIG. 7(*i*) illustrates a rendering of previously rendered frames 200(*f*)-200(*g*) on image presentation device 500 (there are no new frames $200x$ to be rendered and frames 200(*a*)-200(*e*) are no longer rendered). FIG. 7(*j*) illustrates a rendering of previously rendered frame 200(*g*) on image presentation device 500 (there are no new frames $200_x$ to be rendered and frames 200(*a*)-200(*f*) are no longer rendered). FIG. 7(*a*) illustrates a blank image presentation device 500 after all renderings of frames $200_x$ have been performed and dropped based upon the desired dwell.

Figure 8A:
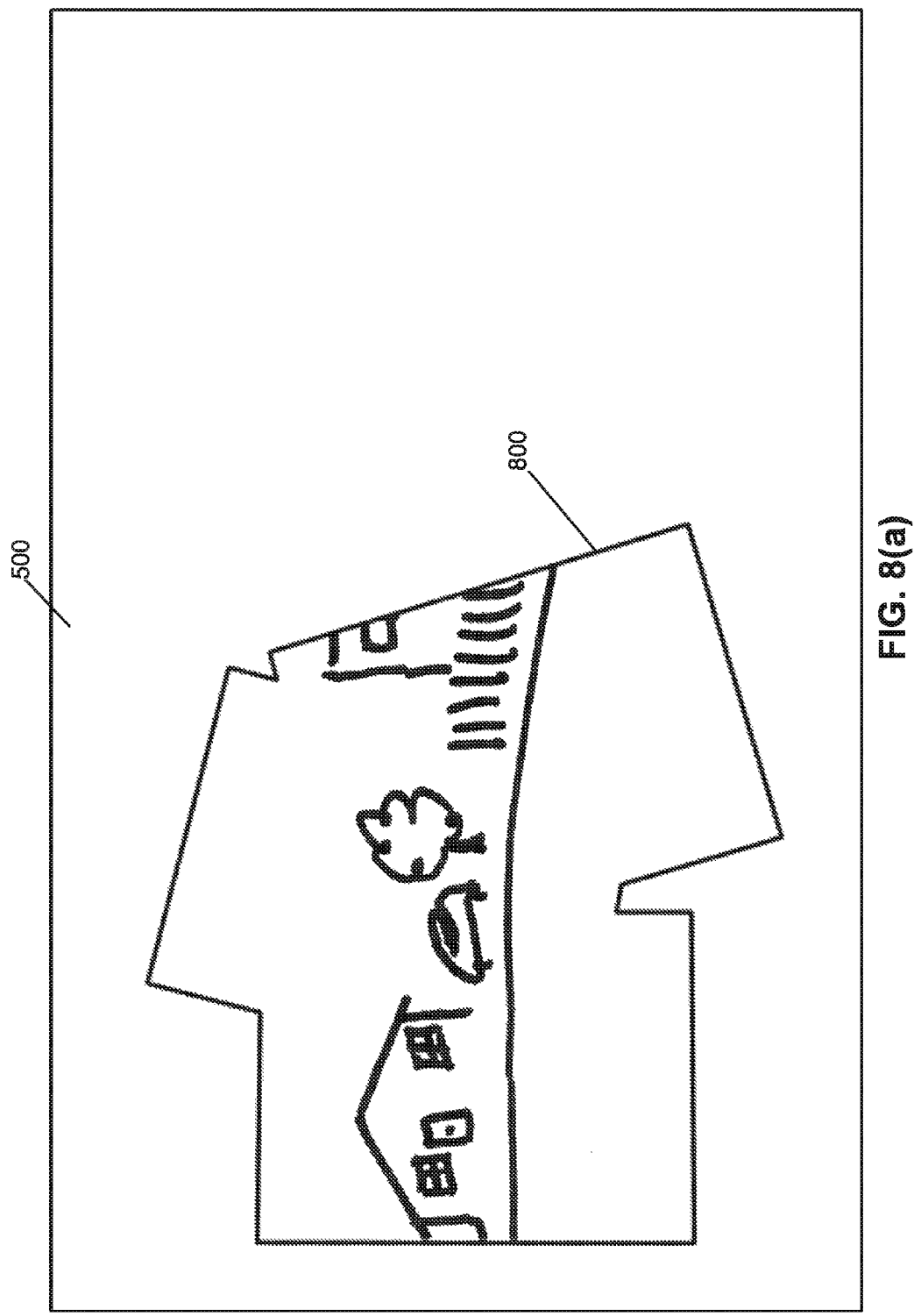
FIG. 8(a) and FIG. 8(b) illustrate rendering of individual frames from the series of frames shown in FIG. 2(a)-FIG. 2(d), with a 3 frame dwell, and including an outline border of currently rendered frames.
Figure 8B:
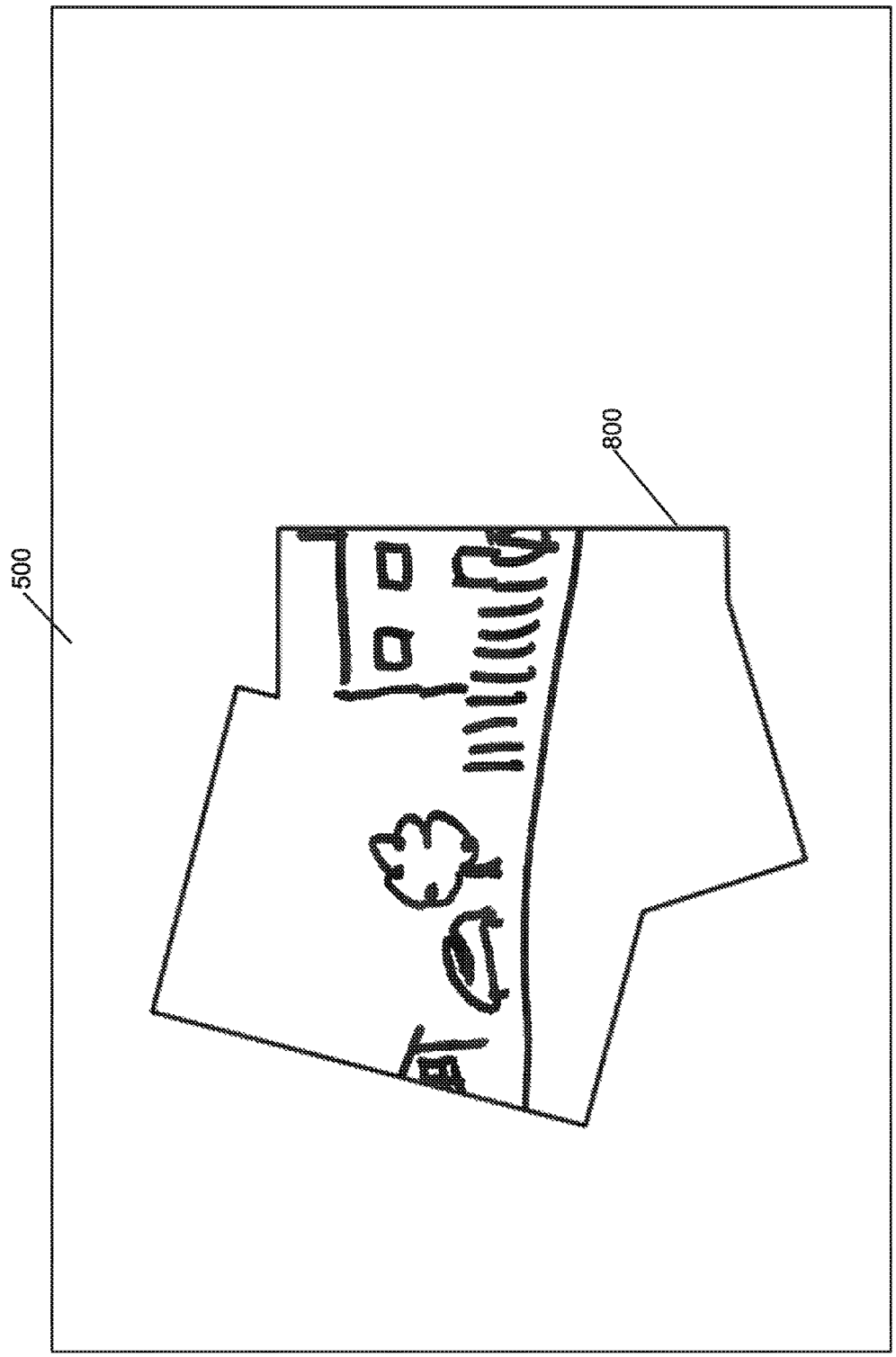

FIG. 8(*a*) and FIG. 8(*b*) illustrate rendering of individual frames $200_x$ from the series of frames shown in FIG. 2(*a*)-FIG. 2(*d*), with a 3 frame dwell, and including an outline border 800 of currently rendered frames. As noted herein, some embodiments may include outline border 800 identifying the aggregation of all, or a portion, of currently rendered frames $200_x$. FIG. 8(*a*), similar to FIG. 7(*d*) includes a rendering of frames 200(*a*)-200(*c*), on image presentation device 500, with the inclusion of outline border 800 tracing out the perimeter of frames 200(*a*)-200(*c*). FIG. 8(*b*), similar to FIG. 7(*e*) includes a rendering of frames 200(*b*)-200(*d*), on image presentation device 500, with the inclusion of outline border 800 tracing out the perimeter of frames 200(*b*)-200(*d*).

Figure 9A:
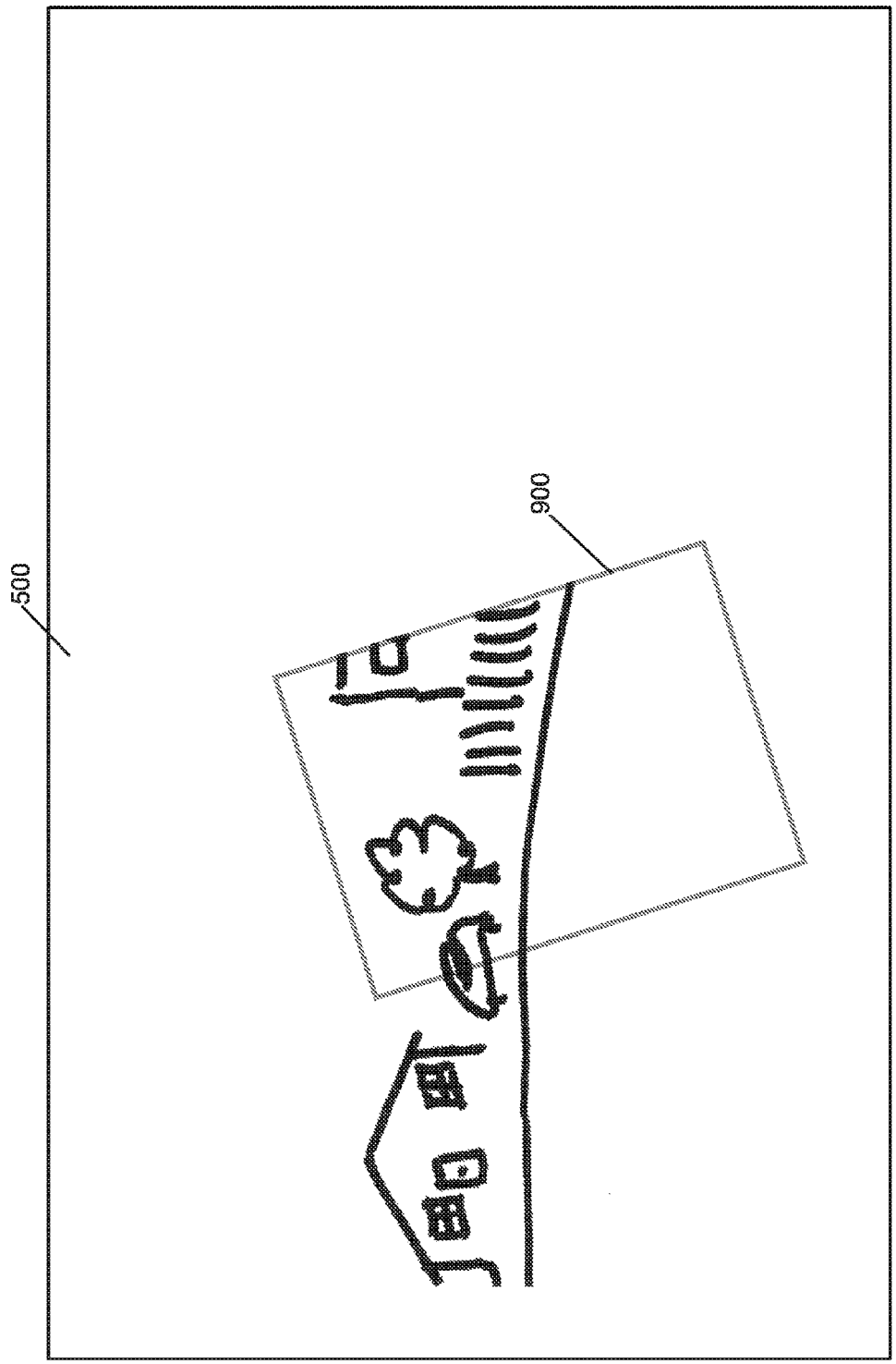
FIG. 9(a) and FIG. 9(b) illustrate rendering of individual frames from the series of frames shown in FIG. 2(a)-FIG. 2(d), with a 3 frame dwell, and including a current frame indicator for the most recently rendered frame.
Figure 9B:
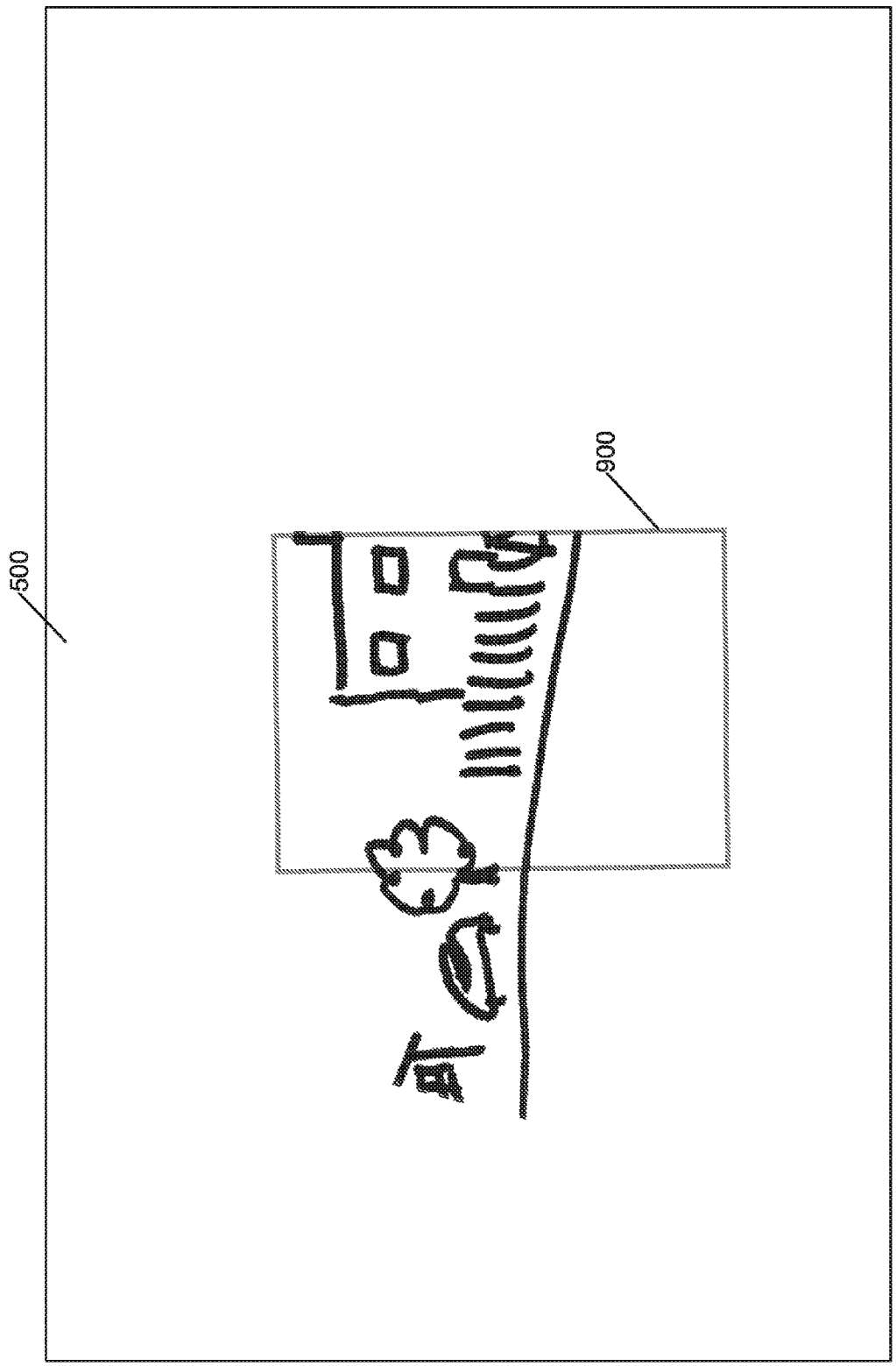

FIG. 9(*a*) and FIG. 9(*b*) illustrate rendering of individual frames $200x$ from the series of frames shown in FIG. 2(*a*)-FIG. 2(*d*), with a 3 frame dwell, and including a current frame indicator 900 for the most recently rendered frame. As noted herein, some embodiments may include current frame indicator 900 identifying the most recently rendered frame $200x$. FIG. 9(*a*), similar to FIG. 7(*d*) includes a rendering of frames 200(*a*)-200(*c*), on image presentation device 500, with the inclusion of current frame indicator 900 tracing out the perimeter of frame 200(*c*). FIG. 9(*b*), similar to FIG. 7(*e*) includes a rendering of frames 200(*b*)-200(*d*), on image presentation device 500, with the inclusion of current frame indicator 900 tracing out the perimeter of frame 200(*d*).

Outline border 800 and current frame indicator 900 are each independently selectable enabling a viewer to customize the presentation of rendered frames using image presentation device 500. Outline border 800 is shown in solid while current frame indicator is shown using 50% opacity. Other arrangements and configurations of these structures are within the scope of the present invention.

Figure 10:
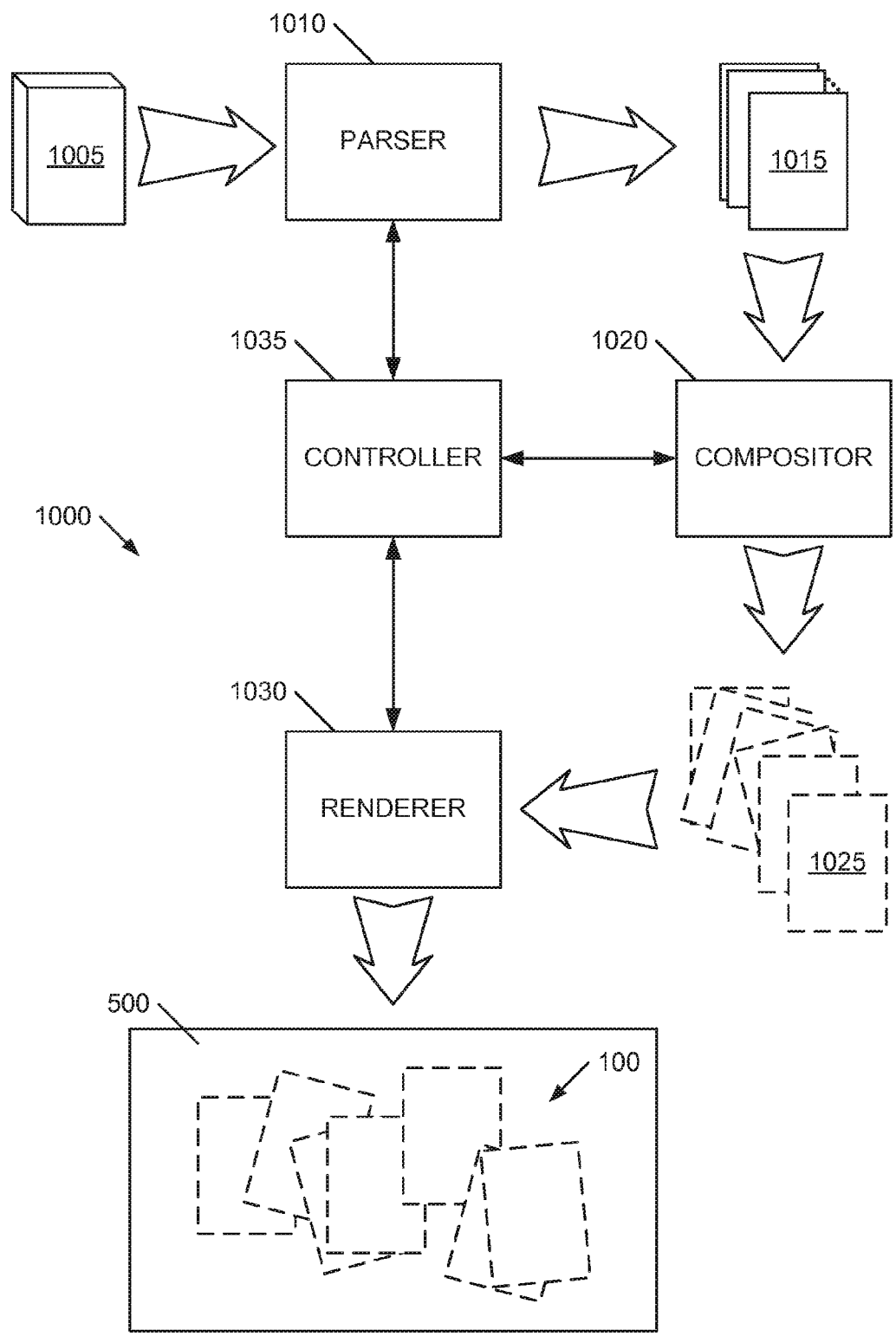
FIG. 10 illustrates a schematic block diagram of a display system.

FIG. 10 illustrates a schematic block diagram of a display system 1000. Display system 1000 receives an electronic file 1005 containing data representing the series of frames. Electronic file 1005 may include discrete frames $200_x$ or some other format that enables production/capture of discrete frames $200_x$. A parser 1010 receives electronic file 1005 and produces/captures a set 1015 of discrete frames $200_x$. A compositor 1020 analyzes set 1015 of discrete frames $200_x$ and establishes a contextual temporal/geographic map 1025 that places each discrete frame $200_i$ within a virtual space and identifies absolute/relative offsets, rotations, and other axial and spatial transformations of one discrete frame $200_m$ to another discrete frame $200_n$, as well as providing any scripting and other available customizations. A rendering engine 1030 uses contextual temporal/ geographic map 1025 to render set 1015 of discrete frames $200_x$ on image presentation device 500 and to generate a replica of actual scene 100. A controller 1035 is coupled to parser 1010, compositor 1020, and rendering engine 1030 to direct, coordinate, and oversee the conversion of electronic file 1005 to replicating actual scene 100. Controller 1035 is preferably a processor implementing machine instructions retrieved from a memory that direct the actions and processes described herein.

One or more of parser 1010, compositor 1020, and rendering engine 1030 may be partially or wholly automated, depending upon the implementation specifics of the data files and desired output. Similarly, one or more of parser 1010 and compositor 1020 may be partially or wholly manual.

Compositor 1020 in some embodiments is an editing/ production system that enables an editor/producer to review set 1015 of discrete frames $200_x$ and to identify overlapping anchor\reference points in multiple frames to use in melding discrete frames $200x$ together. Not all discrete images $200_x$ may share a common anchor/reference point, and it is not always the case that an anchor/reference is visible, or included within the frame itself. The anchor/reference points enable compositor to transform individual ones of discrete frames $200_x$ to align frames consistent with common anchors/references. For example, in frame 200(*a*), frame 200(*b*), and frame 200(*c*), the vehicle may serve as an anchor for these three frames $200_x$. Additionally, for frame 200(*a*) and frame 200(*b*), the building may also be used.

In some cases, automatic feature recognition and matching along with multiaxial/multidimensional scaling and transformation may simplify and/or automate the compositing process. This is particularly true when, as in the preferred embodiments, set 1015 of discrete frames $200_x$ from electronic file 1005 are related and share one or more temporal/geographic characteristics. Display system 1000 enhances those shared characteristics when rendering discrete frames $200_x$ using contextual temporal/geographic map 1025.

Figure 11:
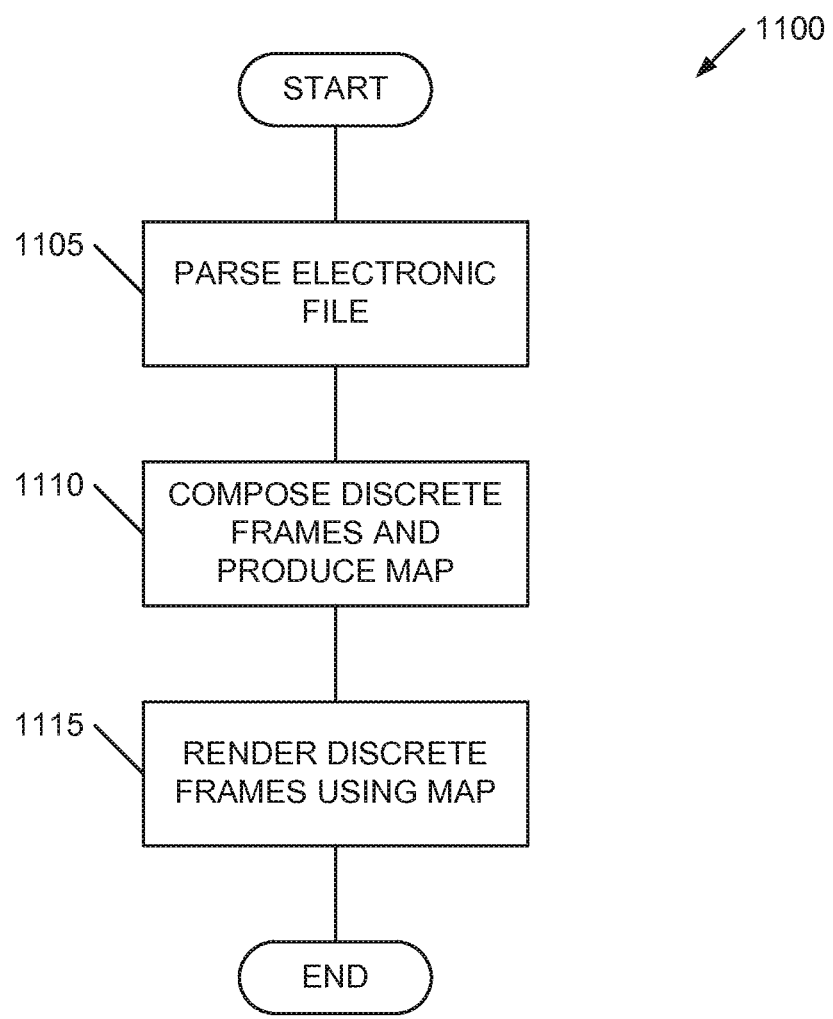
FIG. 11 illustrates a flowchart for a display process.

FIG. 11 illustrates a flowchart for a display process 1100. Display process 1100 includes a parsing step 1105 to operate on electronic file 1005 and produce set 1015 of discrete frames $200_x$. Parsing step 1105 may be simple or complicated depending upon the nature of electronic file 1005 and what is required to identify and produce set 1015.

Following parsing step 1105 is a compositing step 1110 to operate on set 1015. During compositing step 1110, common anchors/reference points are identified in discrete frames 200$_x$ and used to create contextual temporal/geographic map 1025. Contextual temporal/geographic map 1025 identifies the absolute and relative transformations (which includes displacements) of discrete frames 200$_x$ to make a replica of actual scene 100.

Following composing step 1110 is a rendering step 1115 that renders set 1015 on image presentation device 500 using contextual temporal/geographic map 1025. Rendering step 1115 places individual discrete frames 200$_x$ at their appropriate absolute and relative locations in the virtual space and with respect to each other.

In operation, discrete frames are displayed sequentially in the display field, such as within the viewable area of image presentation device 500. Each frame 200$_x$ is positioned in the display field in a position, size, and orientation corresponding to the position and condition of the camera at actual scene 100 at the time that the particular frame 200$_x$ was recorded. Each frame 200$_x$ may be allowed to persist for a time in the display field, to produce a "collage" that is an aggregation of the overlapping frames, progressively building up a replica of the actual scene to provide a continuously updated and relatively stable representation of the rendered scene in the display field. Any background region in the display field that is not covered by a frame is filled with a neutral background color, or pattern or the like, signifying a region of "no photographic information" in the display field. The portion of the scene captured by each individual frame is placed in the correct position relative to the larger scene in the display field (and comprises the latest update to the larger scene). The position of each frame in the display field corresponds to the position of the camera relative to the actual scene at the instant in time that the frame was captured. The sequential location where each frame appears in the display field may therefore jump around, sometimes significantly, according to the motions of the camera field-of-view. The eye of the viewer of the playback can readily track, and rapidly follow these motions relative to the relatively stable background scene in the display field. The eye does, in this way, easily, rapidly, and naturally follow, capture and record each new piece of visual information, together with its spatial location relative to the rest of the scene, much as it would (seemingly effortlessly) in real life at the real scene. Note in addition, that the motions of the camera may be fully represented (rather than being suppressed) in the display, and add an additional dimension to the result, helping to convey an even more comprehensive visual impression of the scene, including the motions of the camera, and the imputed experience of the photographer.

The improved display method embodiments described herein include improvements over existing methods by more naturally engaging and more fully utilizing the natural visual capacity and seemingly effortless performance of the eye of the viewer to capture, comprehend, compensate for, and "see through" even wildly unsteady motions of the camera, the subjects, the viewer, and the eye. Note that in some implementations, rendering frames with desired colocations of identified reference attributes may result in an aggregate composite that has "gaps," "holes," or "seams" of missing content. In some cases, a look-ahead feature may fill in such missing content, at the user discretion, and in other cases, there will be missing content in the aggregate composite. In other cases, such as is typical for the preferred embodiments where the serial/sequential frames are temporal representations of the actual environment, there are elements in the frames that will not be completely consistent. For example, two background people walking in different directions. Depending upon what the editor has chosen to use as a reference, different content elements may appear fragmented, indistinct, fuzzy, or become blended into the background, or disappear. Some embodiments will replace and/or remove inconsistent background/elements. A user, choosing to set a different reference, may produce a markedly different aggregate composite.

In many of the descriptions provided herein, the discussion explicitly addresses the problem of stabilizing a series of frames of a (stationary) scene and ignores the processes for display of normal, intentional, or smooth motions and changes such as panning, zooming in or out, traveling, following a moving object, changing scene, and the like, that would occur in any motion picture. Embodiments of the present invention of course may be adapted to address such scenarios.

Embodiments of the present invention embody a new display paradigm. The new display paradigm represents a departure from a system that seeks to reject the effect of camera motion in the photographic display, to a system that embraces the camera motion as an integral part of the photographic display. Stated in contrasting intuitive terms, whereas the conventional paradigm keeps the frame still and lets the image jump around (image jitter is present), the new paradigm seeks to keep the image still and lets the frame jump around (image jitter is absent). The new display paradigm is able to integrate the camera motion as a part of the photographic picture, or the real-world visual experience that the display is trying to convey to the viewer, where the camera motion is able to be fully represented independently as part of the picture, without apparent image jitter. The preferred embodiments create a realistic impression of the photographed subject as intended by the photographer; and portrays a clear picture of what the photographer experiences, including the user-selected, variably compensated camera motion. The new display paradigm is able to embrace the camera motion as an integral part of the photographic picture, or the real-world visual experience that the display is trying to convey to the viewer, where the camera motion is able to be fully represented independently as part of the picture. Further, in some preferred implementations each customized element to be rendered is a result of a non-destructive process that preserves the original content. Non-destructive embodiments may either apply a modifying display parameter to the original content, or employ altered duplicate content, or use other content preserving methodologies.

In a preferred embodiment, full content of all frames are preserved and never modified. The original data is always available for close examination without loss or any compromise of the original photographic information (only display attributes can be modified). This would make the system especially useful in presenting customized information, such as forensic or other evidentiary or legal documentary evidence, as in court, with assurance that the photographic information is the true and whole original. The original data can then be viewed/analyzed in any fashion with options available in a suitable display/editor system.

In preferred embodiments, the storage format is able to handle multiple formats. Since the user is free to format and store one or more frames any way he wants (not by modifying the content, but by modifying and saving the display parameters) he can create and save multiple formats for display in different contexts. He also can always go back and display them in a new format (e.g., still or motion protocol) any time in the future.

The systems and methods are preferably implemented using a microprocessor executing program instructions from a memory, the instructions causing the apparatus to perform as described herein.

In the description above, the rendered replica of actual scene 100 includes all discrete frames 200$_x$. In some implementations, a scene may include or exclude any or all frames in data set, including frames in the sequence which may have not have been "displayed" yet, for example, some implementations enable a use of a "look-ahead" and analyze upcoming frames to build up background or to establish shared anchors and reference points or other elements to be rendered "out of turn" to aid in understanding or to fill "blank" areas.

Some embodiments of the present invention use the imager as a preprocessor when the picture is taken, or in a postprocessor to prepare for display. Motion data input source can be in any form: actual measurement in the camera via accelerometers, gyroscopes in the camera, calculated through comparisons of image regions within the displayed frames themselves, or data transmitted in a data file or data stream, incorporated in or accompanying the video signal; digital techniques relying on the content of the images themselves to infer calculated camera motion, use of an editor program or software to permit human interpreting and manipulation, and/or combinations thereof.

The editor/player described herein may be capable of setting and adjusting all display parameters. The display is preferably optimized for maximum effect based on authorship, special knowledge of the scene, judgment, or artistic sense, or to adjust positioning, cropping, panning, zooming, playback rate and timing, intentional motion, color correction, editing individual frames, and the like, to help focus on the intended subject of interest, introduce dressings such as current frame highlighting, frame outlining, selection of frames to display, or select frames to stay on top of other frames, or frames to discard to best portray the retained base scene as desired. Display forward or backward, stepwise, or individually, or on a slider back and forth at will. Display of all parameters, adding titles, text and identification numbers and marks as well as other features and elements described herein. The editor is able to create new modified video output or output file, which retains all display information.

Display factors may be included in a header or other data block or other meta-information associated with a new standardized universal data format. Display factors can be X- and Y-displacements or speeds or accelerations, Z-zoom displacements, time of frame or time delay since last frame, Intentional motion (panning, zooming, and the like) or a combination of these including titles, text, notes, dates, help, and the like.

Output may include any form of video to be displayed, such as for example: direct display on computer screen or other computer display device; direct video signal to a video display device, and/or conversion to a conventional or proprietary video data file for storage and subsequent display or use.

In the preceding discussion, to simplify understanding of certain aspects of the present invention, certain parameters and characterizations of embodiments of the present invention include constants that, in a more general description of the present invention, could include variable values. For example, it has already been described that a rendered frame may have a different size or other transformation as compared to an input frame from a data source.

As a matter of convenience, it was described that the rendered frame is composited in a display environment that is larger than frame sizes. It is understood that this description includes a condition that rendered content of the entirety of the display environment is visible. This is true if a viewport matches the display environment. The viewport is that portion of the display environment (e.g., the virtual aggregate composite of renderable frames) that identifies content to be actually rendered (which may not encompass an entire expanse of the virtual aggregate composite). In some embodiments, the viewport is a static description in the contextual map, and in other embodiments, the viewport is dynamic. A dynamic viewport may transform (e.g., scale, change, translate (e.g., change position and the like), rotate, and otherwise modify/define an area of renderable content. In embodiments of the present invention, ultimately rendered content within the viewport is presented on a display device, and the image data for the display device are often visualized in response to being written or otherwise transferred into a display buffer or the like. The viewport may be mapped to such a display buffer in order to visualize the rendered content within the viewport. In such cases, it is possible that some rendered frames do not completely fit within the viewport and may be wholly or partially cropped, or in some cases, completely outside the viewport and not rendered.

The characteristics of the viewport may be created/edited similarly to the creation of the contextual map defining the aggregate composite, such as by an editing process. This editing process may be manual, such as could be the case when an editor defines the viewport prior to rendering any part of the aggregate composite. In other cases, the editing process is automatic based upon parameters designed to achieve the desired effect for the viewport, and is defined prior to any rendering. In other cases the viewport may be defined/modified during the playback/rendering process. A user, for example operating a controller similar to a game controller or the like, interacts with the system to manipulate the viewport (e.g., scale, location, rotation, and the like). Other times, the post-rendering editing process for the viewport may be responsive to user/device settings. For example, the user may have defined particular patterns (e.g., faces, structures, machines, and the like) and the editing process defines the viewport to include/exclude matching/mismatching patterns automatically. The manual/automatic editing process may be configured to override a predetermined viewport definition when necessary or desired.

The system and methods herein have been described in general terms as an aid to understanding details of preferred embodiments of the present invention. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations and/or separation of components or steps will also be considered as within the scope of the present invention, including implementations where the terminology is foreseen as rendering an ability to separate or combine is unclear, provided undue experimentation is not required.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

What is claimed as new and desired to be protected by Letters Patent of the United States is:

1. A computer implemented video playback method for displaying a series of input frames, wherein each input frame of the series of input frames has an associated camera orientation information, a visible image content, and a frame boundary;

wherein the camera orientation is independently fully displayed, the visible image content is displayed stabilized free from the disturbing effects of the camera orientation motion, and no image content is lost by constructing an output video comprising a series of output display frames using a display frame larger than any input frame of the series of input frames and wherein each input frame of the series of input frames is placed in a position within an output display, wherein the camera orientation is displayed by the location and rotation of the input frame boundary as placed within the output display frame; the visible image content is displayed in the output display frame free of the destabilizing effects of the camera motion, and the camera motion is simultaneously depicted by the apparent motion of the input frame boundary of within the display frame in the output series of display frames rendered as a moving visual image stream; the method comprising the steps of:

(a) placing a first input frame of the series of input frames within a first output display frame of the series of output display frame, which positions the first input frame at a particular location relative to the first output display frame, and thereafter (b) determining the placement position to depict the position of the second input frame of the series of input frames to be placed relative to the position of the first input frame responsive to the camera orientation information associated with the second input frame relative to the first input frame, (c) placing the second input frame in the second output display frame of the series of output display frame in the position determined in step (b), (d) rendering the series of output display frames as a moving visual image stream wherein, since an instantaneous camera orientation is depicted as the apparent location and rotation of a particular frame boundary within its associated output display frame, the apparent camera motion is depicted as the apparent motion of the frame boundary within the series of output display frames rendered as a moving visual image stream;

wherein said rendering step preserves a portion of any previously rendered content including the first frame; wherein said portion of any previously rendered portion is outside the boundary of said second frame and wherein said portion of any previously rendered content has a dwell period, with said portion of any previously rendered content removed from the display frame after having been rendered in the display frame for a time responsive to said associated dwell period.

2. The video method of claim 1 where the input frame associated camera orientation information is provided implicitly in the visible content of each frame and are inferred by analysis of the image content and the apparent positions of selected visible features relative to the borders of each first input frame and second input frame, features that are presumed to be stationary in an intended frame of reference.

3. The video method of claim 2 wherein the selected feature defines the intended frame of reference as the feature itself.

4. The video method of claim 1 wherein the dwell period is specified in a number of frames.

5. The video method of claim 4 wherein the dwell period includes three frames.

* * * * *